(12) United States Patent
Helms

(10) Patent No.: US 10,845,676 B1
(45) Date of Patent: Nov. 24, 2020

(54) ADJUSTABLE FISH-SUPPORTING PHOTOGRAPHIC RACK ASSEMBLY

(71) Applicant: Thomas Scott Helms, Panama City, FL (US)

(72) Inventor: Thomas Scott Helms, Panama City, FL (US)

(*) Notice: Subject to any disclaimer, the term of this patent is extended or adjusted under 35 U.S.C. 154(b) by 0 days.

(21) Appl. No.: 16/531,916

(22) Filed: Aug. 5, 2019

Related U.S. Application Data

(63) Continuation-in-part of application No. 16/020,454, filed on Jun. 27, 2018, now abandoned.

(60) Provisional application No. 62/525,251, filed on Jun. 27, 2017.

(51) Int. Cl.
*G03B 15/00* (2006.01)
*A47F 7/00* (2006.01)
*A01K 97/00* (2006.01)

(52) U.S. Cl.
CPC .............. *G03B 15/00* (2013.01); *A01K 97/00* (2013.01); *A47F 7/0071* (2013.01)

(58) Field of Classification Search
None
See application file for complete search history.

(56) References Cited

U.S. PATENT DOCUMENTS

| | | | | |
|---|---|---|---|---|
| 2,038,903 A | * | 4/1936 | Rakatzky | A47F 7/0071 211/96 |
| 2,066,478 A | * | 1/1937 | Lewin, Jr. | A47F 5/10 211/206 |
| 2,987,195 A | * | 6/1961 | Smith | A47F 5/10 211/175 |
| 3,199,820 A | * | 8/1965 | Thompson | A22C 25/06 248/222.41 |
| 3,481,487 A | * | 12/1969 | Paruolo | A47B 57/425 211/208 |
| 3,483,995 A | * | 12/1969 | Larson | A47F 5/0815 248/220.41 |
| 3,880,390 A | * | 4/1975 | Niven | A47F 5/0815 248/220.43 |
| 4,708,311 A | * | 11/1987 | Clausen | A47F 5/0846 211/87.01 |
| 4,830,318 A | * | 5/1989 | O'Brien | A47F 5/0815 248/165 |
| 4,977,643 A | * | 12/1990 | Prysock | A22C 25/00 452/187 |

(Continued)

*Primary Examiner* — William B Perkey
(74) *Attorney, Agent, or Firm* — Glenn E. Gold, P.A.; Glenn E. Gold

(57) ABSTRACT

An adjustable fish-supporting photographic rack assembly particularly well-suited for temporarily supporting a catch of fish in a highly organized manner during the taking of a photograph or digital image thereof includes a main panel body having a front surface, a rear surface, and a periphery defined by contiguous upper, lower, left and right peripheral edges. A pair of main panel supports includes respective integral depressions sized and shaped to conform to opposite lower corners of the main panel body for snugly receiving and retaining the lower corner portions therein, effectively supporting the main panel in an upright vertical orientation. At least one structural feature integrated into the front surface of the main panel body is configured to correspondingly receive at least one hook-receiving structure for selectively coupling a fish-supporting hook member thereto.

10 Claims, 26 Drawing Sheets

(56) References Cited

U.S. PATENT DOCUMENTS

| | | | | |
|---|---|---|---|---|
| 5,060,897 A | * | 10/1991 | Thalenfeld | A47F 5/08 |
| | | | | 211/57.1 |
| 5,100,365 A | * | 3/1992 | Johnson | A22B 5/06 |
| | | | | 452/187 |
| 5,356,104 A | * | 10/1994 | Rosenberg | A47B 96/061 |
| | | | | 248/223.41 |
| 5,620,104 A | * | 4/1997 | Maglione | A47F 5/0815 |
| | | | | 211/189 |
| 5,927,517 A | * | 7/1999 | Lipman | A47F 5/0815 |
| | | | | 211/106 |
| 6,349,909 B1 | * | 2/2002 | Zarrow | A47F 5/0823 |
| | | | | 211/57.1 |
| 8,579,126 B1 | * | 11/2013 | Cole | A47F 7/0071 |
| | | | | 211/175 |
| 9,339,020 B1 | * | 5/2016 | Mason | A22C 25/00 |
| 9,993,094 B1 | * | 6/2018 | Franzone, Jr. | A47F 5/0807 |
| 10,021,859 B1 | * | 7/2018 | Miller | G01G 23/3742 |
| 2005/0016943 A1 | * | 1/2005 | Dick | A47F 5/0815 |
| | | | | 211/70.6 |
| 2006/0017841 A1 | * | 1/2006 | Farrell | G08B 13/19626 |
| | | | | 348/373 |
| 2011/0049315 A1 | * | 3/2011 | Buckbee | A01K 97/00 |
| | | | | 248/219.4 |

* cited by examiner

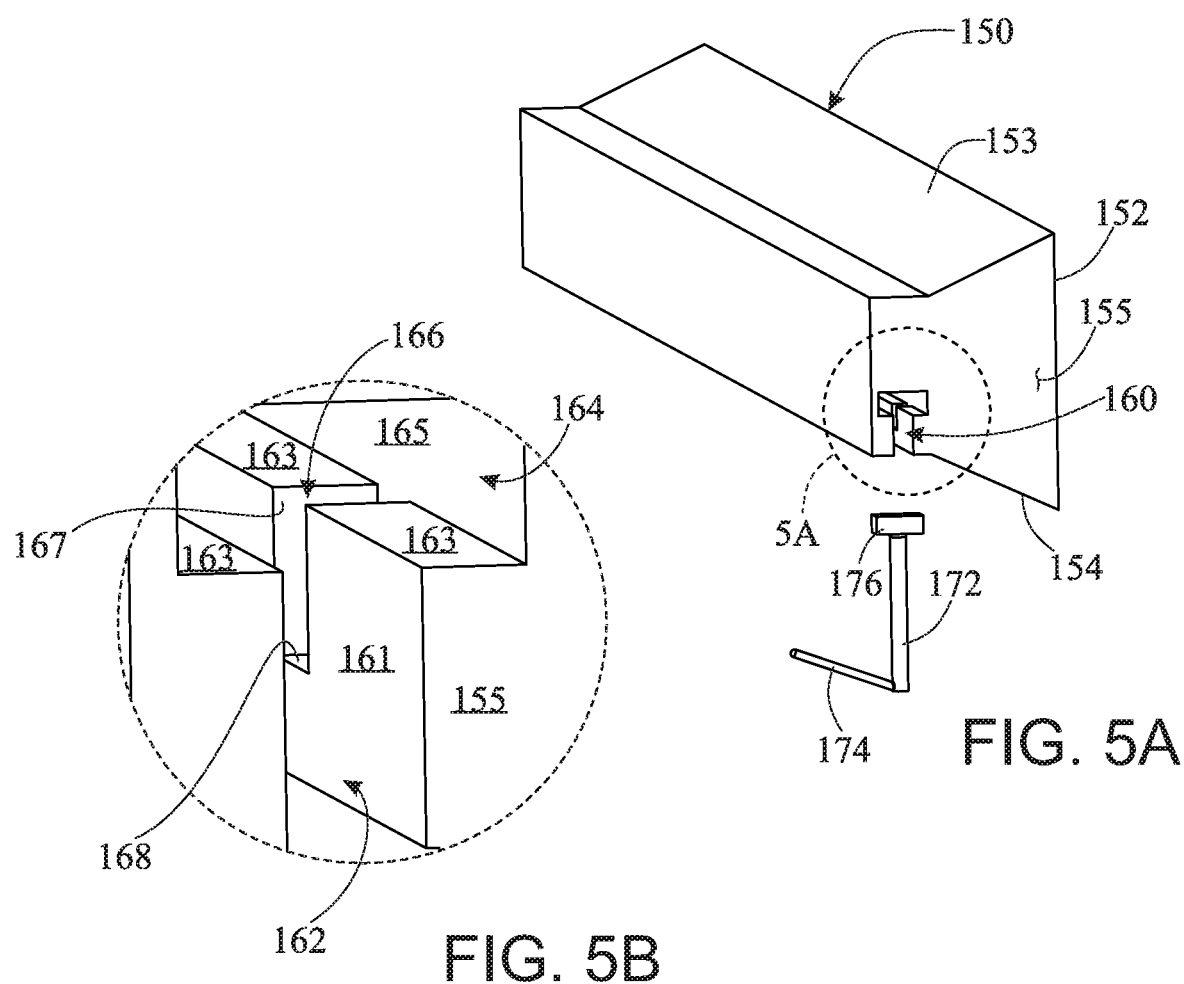

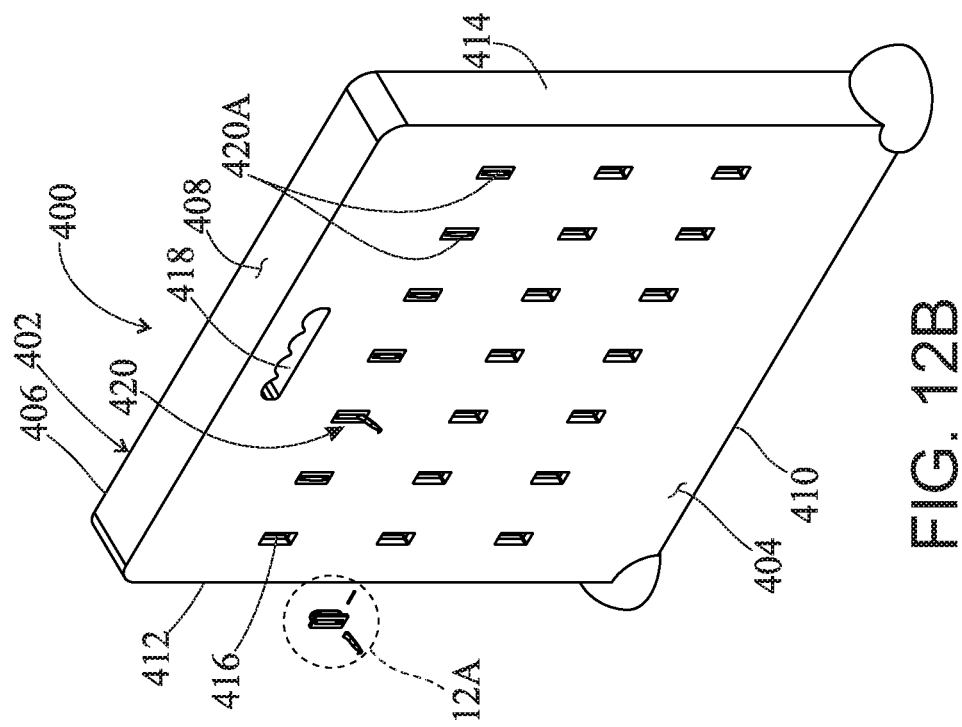
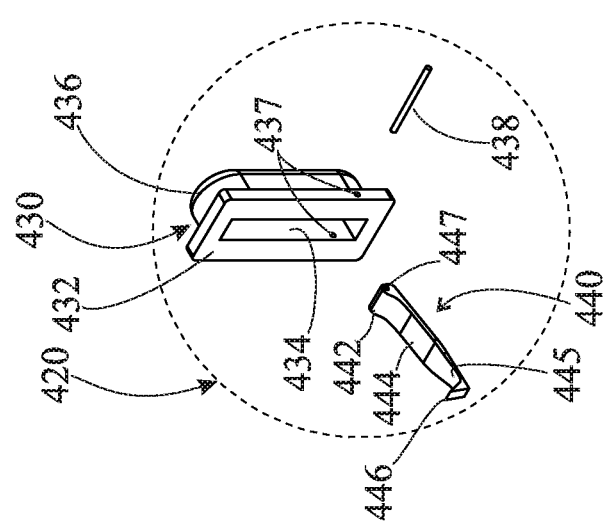
FIG. 12B
FIG. 12A

ADJUSTABLE FISH-SUPPORTING PHOTOGRAPHIC RACK ASSEMBLY

CROSS-REFERENCE TO RELATED APPLICATIONS

This application is a continuation-in-part of U.S. non-provisional patent application Ser. No. 16/020,454, filed on Jun. 27, 2018, which claims the benefit of U.S. provisional patent application No. 62/525,251, filed on Jun. 27, 2017.

FIELD OF THE INVENTION

The present disclosure relates generally to the temporary hanging of a catch of fish for picture taking of the catch alongside one or more anglers, and more particularly to structures used for this purpose.

BACKGROUND OF THE INVENTION

Recreational fishing, also called sport fishing, is fishing for pleasure or competition. It can be contrasted with commercial fishing, which is fishing for profit, or subsistence fishing, which is fishing for survival. The most common form of recreational fishing is done with a rod, reel, line, hooks and one or more of a wide range of baits and lures. Recreational fisherman typically fish from either a boat of their own or, alternatively, from a charter boat. In the case of charter boat fishing, anglers elect to pay a charter boat operator (often the owner of the charter boat) to take them fishing. Charter boat fishing is often advantageous, since a charter boat operator (and accompanying crew members) will generally be more highly skilled at fishing than the anglers chartering the boat. Furthermore, in light of their experience, charter boat operators are often more successful finding fish to catch.

In the case of charter boat fishing, at the end of a fishing charter it is commonplace for the charter boat operator to arrange a catch of fish caught by anglers in order to enable the anglers (with or without the fishing charter operator and crew) to take pictures with their catch. Oftentimes, the fish are simply laid out on a dock and/or held by the anglers in preparation of a picture. In other instances, the catch of a fish may be temporarily hung from a length of cord, a series of nails hammered into a piece of wood, a series of large hooks hanging from a horizontal rod or similar structure, and the like. In the case of cord, one end may be tied around the fish's tail (or through the fish's mouth and gill) and the opposite end secured to a raised horizontally-oriented supported beam, such as a length of wood (e.g. a 2×4), typically in a less-than-orderly manner. In the case of nails and hooks, such hardware is typically attached to a similar raised horizontally-oriented supported length of wood or, alternatively, hooks are sometimes providing hanging from a raised, horizontally-oriented supported length of metal pipe or other conduit. In all instances, the resulting structures are generally fashioned in a very crude and non-aesthetically pleasing manner. In the case of anglers fishing from their own boats, there is an abysmal choice of portable structures to enable such "weekend warriors" to hang their own catch in a neat and orderly manner conducive to picture taking. Developments in this area have been limited to very crude portable fish-hanging products. Generally, such portable fish-hanging products have been limited to not much more than a length of wood having fish hanging mechanisms (e.g. nail and hooks) attached in a spaced-apart manner along the length of wood. Furthermore, such products require at least two individuals to support opposite ends of the length of wood a distance above the ground surface, and a third individual to take a picture. Generally speaking, there has been a complete lack of development in the area of such fish-hanging structures that are portable, easy to install and use, and that are constructed with the intent to provide an aesthetically pleasing backdrop for the aforementioned picture taking function.

Accordingly, there is a long felt, as of yet unmet, need for an improved fish-hanging apparatus particularly well-suited for facilitating the taking of pictures of anglers with their catch of fish, wherein the catch of fish are arranged in an organized manner and wherein the organized arrangement of fish in combination with an aesthetically pleasing stanchion-type structure, provide a means for anglers to take high quality pictures with their catch of fish. It would be further desirable to provide such a fish-hanging stanchion incorporating fish-supporting components (e.g. hooks) that are assembled in a manner enabling adjustability of position and orientation thereof into a preferred arrangement, depending upon factors such as the quantity of fish being supported and the relative sizes of the respective fish. In particular, it would be beneficial to be able to adjust the quantity of hooks, the spacing, or gap, between adjacent hooks, as well as to selectively rotate and/or retract individual hooks (e.g. rotating/retracting unused hooks so that they are not facing outward in an unsafe manner). It would be further desirable to provide such an adjustable fish-supporting photographic rack assembly having a sturdy, easily assembled and disassembled structure having a construction conducive to exposure to a salt water environment without suffering from structural aesthetic degradation from such exposure. It would be highly beneficial to have such an adjustable fish-supporting photograph rack assembly incorporating an optional selectively-attachable advertising banner structure for enabling additional advertising (e.g. for advertising contact information pertaining to the charter boat operator). It would be preferable for the rack assembly to include at least one permanent surface area sized, shaped and located, upon a highly visible front surface of the photographic rack assembly to provide permanent marketing and/or advertising graphics pertaining, for example, to the source of the photographic rack assembly (including, for example, a corresponding product brand/trademark, product manufacturer contact information to order the product and related accessories, etc.).

Moreover, it is preferred that the fish-supporting photographic rack assembly itself has a size, shape and construction that is conducive to enabling one or more anglers to stand behind the rack in a visible manner while a picture is being taken, with the fish and any such advertising or other information prominently displayed in a highly aesthetically-pleasing fashion.

SUMMARY OF THE INVENTION

The present disclosure is generally directed to an adjustable fish-supporting photographic rack assembly particularly well-suited for temporarily supporting a catch of fish in a highly organized manner during the taking of a photograph or digital image thereof, wherein the adjustable fish-supporting photographic rack includes:

a main panel body having a front surface, a rear surface, left and right edges, and upper and lower edges;

at least one structural feature integrated into the front surface of the main panel body;

at least one fish-supporting hook member; and at least one hook-receiving structure for selectively coupling said at least one fish-supporting hook member to said main panel body front surface.

In an aspect, the at least one fish-supporting hook member and the at least one hook-receiving structure may engage one another in a manner enabling the fish-supporting hook member to be selectively adjusted between an open, fish-supporting, position and a closed position. In the closed position, the fish-supporting hook member may, for example, be maintained either rotated into an orientation wherein substantially the entire length of the hook member, or the hook body, butts up against the main panel body front surface to prevent the sharp fish-supporting end of the hook member from jutting outward. Alternatively, in the closed position the fish-supporting hook member may be fully retracted into a main panel body cavity.

In another aspect, a pair of main panel body supports may be provided sized, shaped and otherwise configured for engagement with the main panel body in order to securely maintain the main panel body in a vertically-oriented upright manner. Furthermore, each main panel body support may include a depression sized and shaped for snugly receiving a corresponding one of the lower corners of the main panel body therein. Still further, an aperture may be provided extending through a lower surface of the depression for receiving a mechanical fastener to fixedly attach the main body panel support to an underlying supporting ground surface (e.g., a wooden dock). Still further, each main panel body support may be hollow and include a selectively accessible sealable port for enabling the controlled ingress and egress of a weight providing material (e.g. sand, water, etc.).

In another aspect, a banner advertising subassembly may be provided configured to be selectively mounted upon the main panel body upper edge by at least one support post affixed to the banner and configured for releasable coupling with one or more corresponding apertures extending into the main body panel upper edge.

In another aspect, the at least one structural feature integrated into the front surface of the main panel body may be a laterally-oriented dovetail groove extending between the left and right edges of the main panel body, and the at least one hook-receiving structure for selectively coupling the at least one fish-supporting hook member to the main panel body front surface may be a unitary laterally-extending member slidably-receivable within the dovetail groove such that a forward portion of the laterally-extending member juts out slightly beyond the main panel body front surface and incorporates a laterally-extending T-shaped channel extending into a bottom surface thereof for slidably-receiving the at least one hook member therein.

In another aspect, the at least one structural feature integrated into the front surface of the main panel body may be a laterally-oriented dovetail groove extending between the left and right edges of the main panel body, and the at least one hook-receiving structure for selectively coupling the at least one fish-supporting hook member to the main panel body front surface may be a plurality of individual block members sized, shaped and otherwise configured for being slidably-received within the laterally-oriented dovetail groove and having a corresponding fish-supporting hook member securely affixed thereto, wherein the hook member preferably extends outwardly, and depending downwardly, therefrom. In this manner, individual hook-supporting blocks may be selectively translated along the dovetail groove to corresponding desired locations along the corresponding dovetail groove.

In another aspect, the at least one hook-receiving structure for selectively coupling the at least one hook-supporting member to the main panel body front surface may be a hook-supporting bracket member affixed to the main panel body front surface.

In another aspect, the hook-receiving structure for selectively coupling the at least one hook-supporting member to the main panel body front surface may include at least one selectively-pivotable, rotationally-biased hook subassembly mounted within at least one panel body cavity provided extending into the main panel body front surface. For example, rotational bias of the hook may be accomplished via a torsion spring biasing rotation of the hook about a hook-support pin at least partially laterally spanning the at least one panel body cavity.

In another aspect, the at least one structural feature integrated into the front surface of the main panel body may include at least one aperture, the fish-supporting hook member may include an externally-threaded end portion, and the at least one hook-receiving structure for selectively coupling the at least one fish-supporting hook member to the main panel body front surface may be a mechanical barrel member having a threaded internal surface for threadingly engaging the corresponding externally threaded end portion of the fish-supporting hook member.

In another aspect, at least the main panel body, and preferably all of the components of the assembly, has a composition and construction that is resistant to degradation from harsh environmental conditions such as, for example, sunlight and salt water. Examples of such materials include, but are not limited to, fiber-reinforced plastics (such as fiberglass), marine grade metals (e.g., carbon steel, alloy steel, stainless steel and galvanized steel), marine grade polymers, and marine grade wood, to name just a few).

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which:

FIG. 5A presents a top-front-right isometric view of a lateral hook-supporting member 150 of the adjustable fish-supporting photographic rack assembly 100 shown in FIGS. 1-4;

FIG. 5B presents a magnified detailed view of laterally-extending T-shaped channel 160 of the laterally-extending hook-supporting member 150 shown in FIG. 5;

FIG. 12B presents a top-front-right isometric view of a fourth exemplary implementation of an adjustable fish-supporting photographic rack assembly in a partially assembled state, wherein a sampling of selectively pivotable hook subassemblies 420 are shown in various states of assembly and position (i.e., open and closed);

FIG. 12A presents a magnified view of the selectively-pivotable hook subassembly 420 shown as an exploded view in FIG. 12;

FIG. 15A presents an enlarged view of the hook member 640 shown in FIGS. 14 and 15;

FIG. 15B presents an enlarged view of the bolt 652 used to secure the central panel 630 to the framework 602 of the fish-supporting photographic rack assembly shown in FIGS. 14 and 15;

FIG. 15C presents an enlarged view of the nut 650 used to secure the hook member 640 on to the central panel 630 of fish-supporting photographic rack assembly shown in FIGS. 14 and 15;

Like reference numerals refer to like parts throughout the various views of the drawings.

DETAILED DESCRIPTION OF EXEMPLARY IMPLEMENTATIONS

Figure 1:
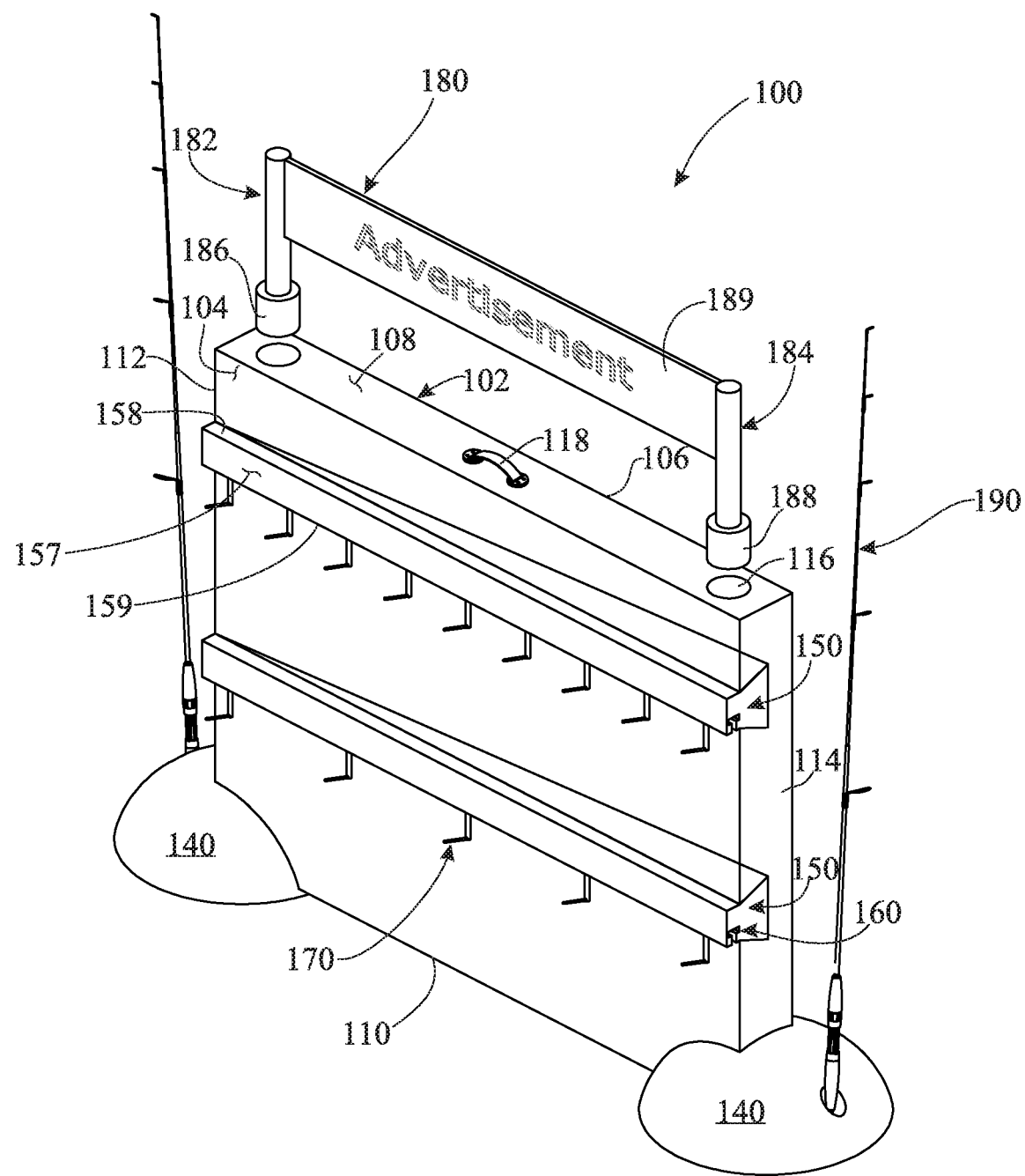
FIG. 1 presents a top-front-right isometric view of an adjustable fish-hanging photographic rack assembly in a fully assembled state (with mountable display apparatus 180 shown slightly exploded to expose receiving apertures 116) in accordance with a first exemplary implementation of the invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-13, various exemplary implementations of a portable, adjustable fish-supporting photographic rack assembly are shown in accordance with the present invention. Generally, the various implementations of the assembly overcome at least the aforementioned long-standing drawbacks, disadvantages and limitations of conventional known structures used for temporarily displaying a catch of fish.

Referring initially to FIGS. 1-6, in accordance with a first exemplary implementation of the present invention, an adjustable fish-supporting photographic rack assembly is shown generally as reference numeral 100. Rack assembly 100 includes a main panel body 102 having a front surface 104, a rear surface 106, an upper edge 108, a lower edge 110, a left edge 112 and a right edge 114. As will be apparent to those skilled in the art, although main panel body 102 is shown having a rectangular geometry, alternate geometries may be employed without departing from the intended scope of the invention. Thus, for example, although main panel body 102 is shown having four individual edges 108, 110, 112 and 114, the shape of the periphery could be altered, and the corners may be rounded such that there is, for instance, a single contiguous peripheral edge. Optionally, apertures 116 may be provided extending into upper edge 108 for selectively supporting a mountable display apparatus 180. As shown, display apparatus 180 may include a display banner 189 supported between, and spanning, a left support post 182 and a right support post 184. The support posts 182, 184 may be inserted directly into corresponding apertures 116. Optionally, left and right collars, 186 and 188, respectively, may be disposed about the lower ends of corresponding left and right posts, 182 and 184, to provide improved structural support. Although the composition of the collars is not intended to be limited, it would be preferable to incorporate resilient collars to enable frictional support of the inserted post ends.

A carrying handle 118 may be provided on the upper edge 108 (as shown in FIG. 1) or, alternatively, on one of the side edges 112, 114 or on the rear surface 106. Referring briefly to the alternative implementation of FIG. 8, carrying handles 218 are shown, for example, on an upper edge 208 and a rear surface 206 of main panel body 202. Furthermore, referring briefly to the alternative implementation shown in FIG. 12, a carrying handle 418 may be provided as an integral feature of the main panel body 402. Likewise, in the exemplary implementation shown in FIG. 13, a carrying handle 518 is shown integrally formed with main panel body 502.

A pair of supports 140 for securely maintaining main panel body 102 in an upright orientation may be provided. Each support 140 preferably has a geometry, or configuration, minimizing the risk of an individual inadvertently injuring his foot or toes when walking near the photograph rack assembly 100. Each support 140 may be defined by a base, or lower surface 142 having a circular lower periphery 141 transitioning to a convex upper surface 143. The convex upper surface 143 of each support 140 preferably includes an integral cavity 144 defined by interior lower horizontal surface 145, opposing interior vertical surfaces 147 extending upwardly from lower horizontal surface 145, and rear vertical surface 146 extending upwardly from lower horizontal surface 145 and spanning interior opposing vertical surfaces 147. In this manner, the lower corners of main panel body 102 may be snugly received within corresponding cavities 144 of the pair of supports 140. Optionally, each support 140 may include a cavity (or aperture) 148 for receiving a fishing rod 190 (FIG. 1) to add to the aesthetically pleasing nature of a photograph. Alternatively, reference numeral 140 may represent an aperture configured for receiving a mechanical fastener therethrough in order to securely fasten each support 140 to an underlying support surface, such as a dock. As will be apparent to those skilled in the art, it is contemplated to incorporate a hollow support 140 having an opening (not shown) extending through upper surface 143 into a corresponding support body interior space (not shown) to enable the ingress (and egress) of a material, such as water, sand, pebbles and the like, to provide additional weight to each support 140 for increased stability of the supported main panel body 102. In that case, it would be preferably to include a plug, cap or similar structure for selectively opening and closing the opening, as desired.

Figure 2:
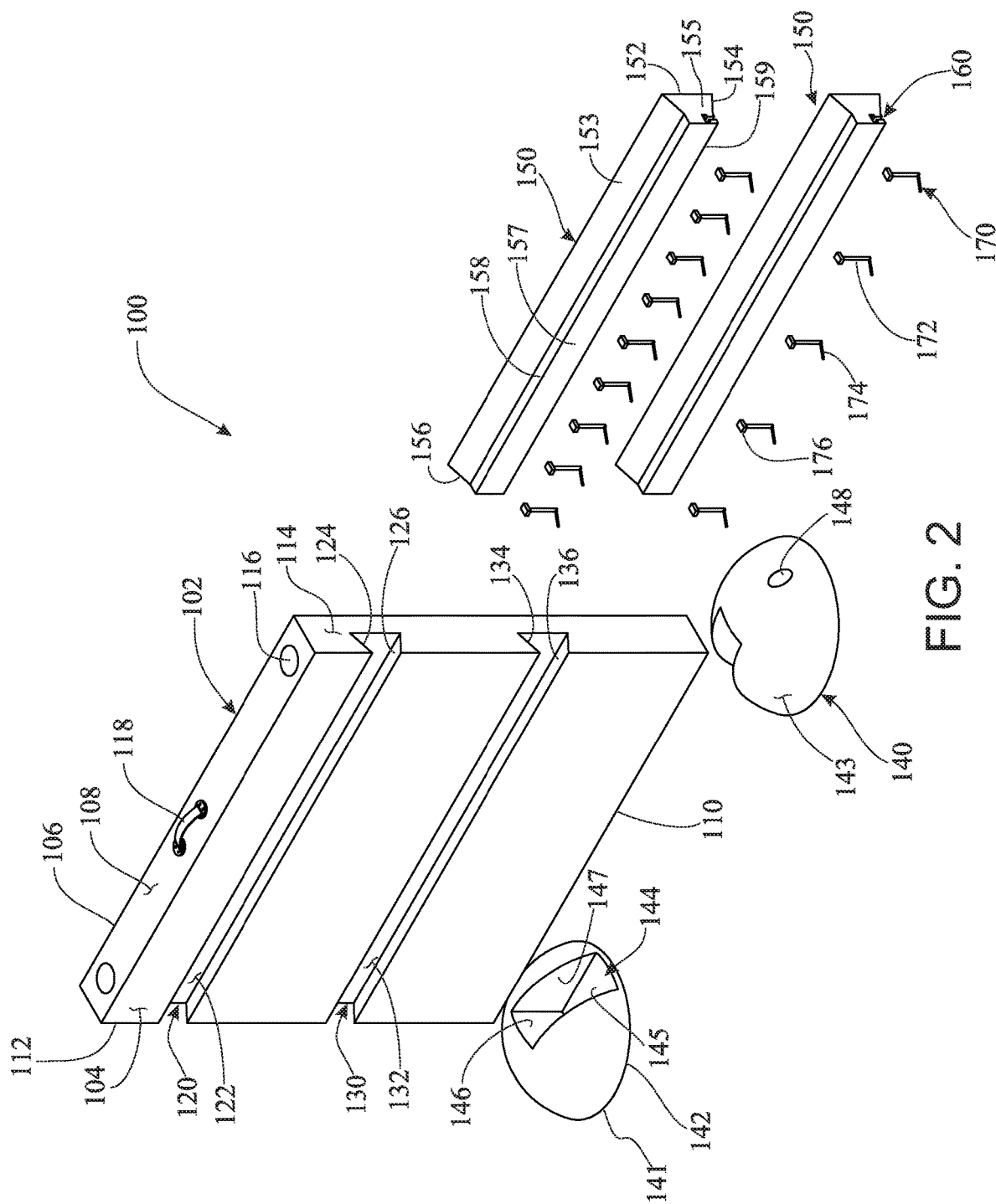
FIG. 2 presents an exploded view of the adjustable fish-supporting photographic rack assembly shown in FIG. 1 (with mountable display apparatus 180 and fishing rods 190 removed for clarity)
Figure 3:
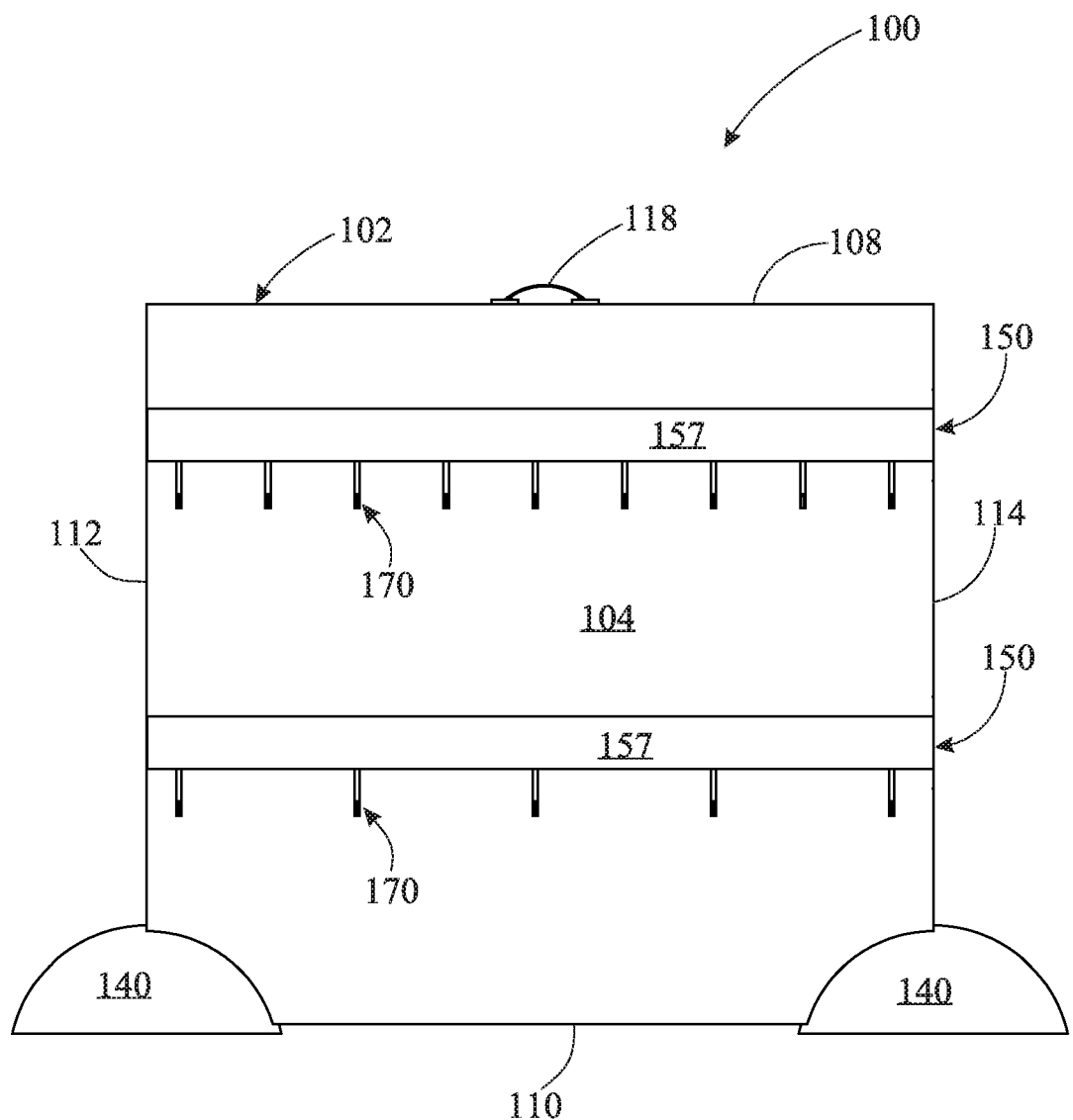
FIG. 3 present a front elevation view of the adjustable fish-supporting photographic rack assembly introduced in FIG. 2 (shown in a fully assembled state)

Referring again primarily to the exemplary implementation shown in FIGS. 1-6, and as most clearly shown in FIG. 2, an upper dovetail groove 120 is provided integrated into front surface 104 running laterally between left edge 112 and right edge 114. The upper dovetail groove 120 is defined by a rear surface 122 a tapered upper surface 124 and a tapered lower surface 126. The upper dovetail groove 120 is sized, shaped and otherwise configured for slidably receiving therein laterally-extending hook-supporting member 150, having a geometry defined by rear planar surface 152, tapered upper surface portion 153, tapered lower surface portion 154, right end 155, left end 156, front surface portion 157, planar upper surface portion 158, planar lower surface portion 159, and laterally-extending T-shaped channel 160 extending through planar lower surface portion 159.

Figure 4:
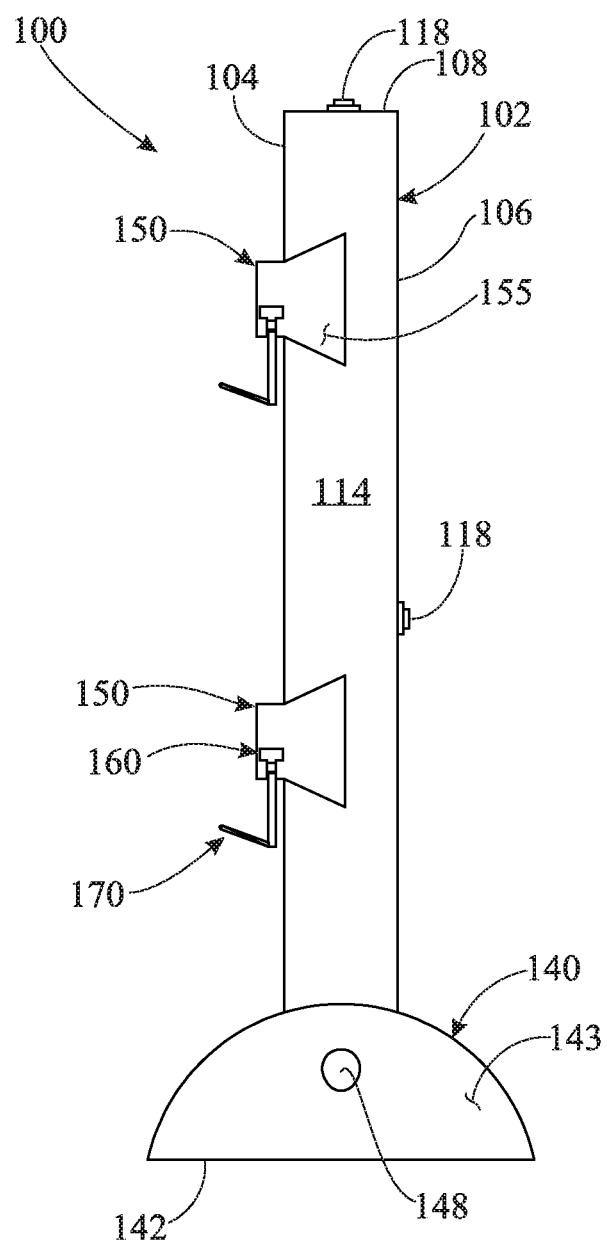
FIG. 4 presents a right side elevation view of the adjustable fish-supporting photographic rack assembly shown in FIG. 3.

Accordingly, when hook-supporting member 150 is slidably inserted into upper dovetail groove 120, hook-supporting member tapered upper surface portion 153 frictionally engages upper dovetail groove tapered upper surface 124, hook-supporting member tapered lower surface portion 154 frictionally engages upper dovetail groove tapered lower surface 126, and hook-supporting member rear planar surface 152 frictionally engages upper dovetail groove planar rear surface 122. Referring briefly to FIG. 4, it can be seen that once hook-supporting member 150 is completely inserted into upper lateral dovetail groove 120 a portion of the hook-supporting member 150—as defined by front surface portion 157, planar upper surface portion 158 and planar lower surface portion 159—extends, or juts, outwardly beyond front surface 104 of main panel body 102. In this manner, laterally-extending T-shaped channel 160 likewise extends out beyond main panel body front surface 104 to provide adequate clearance for receiving unitary fish-supporting hook members 170.

Figure 6A:
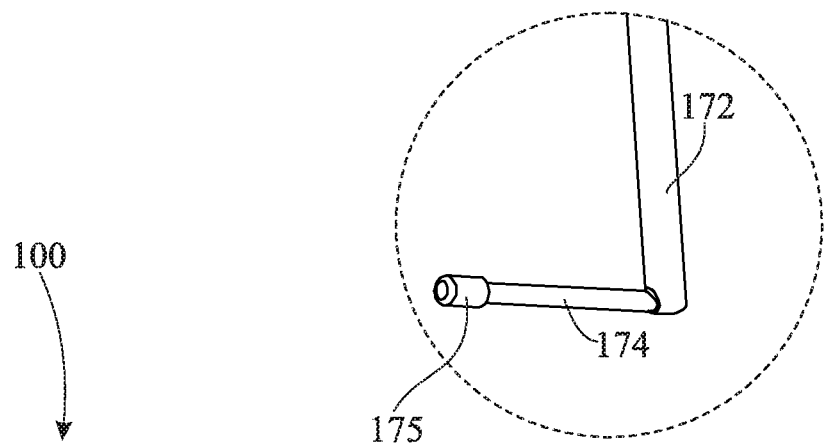
FIG. 6A presents a magnified detailed view of unitary fish-supporting hook component 170 of FIG. 6, further illustrating a protective safety covering cap 175 disposed over a pointed end of the hook component.
Figure 6B:
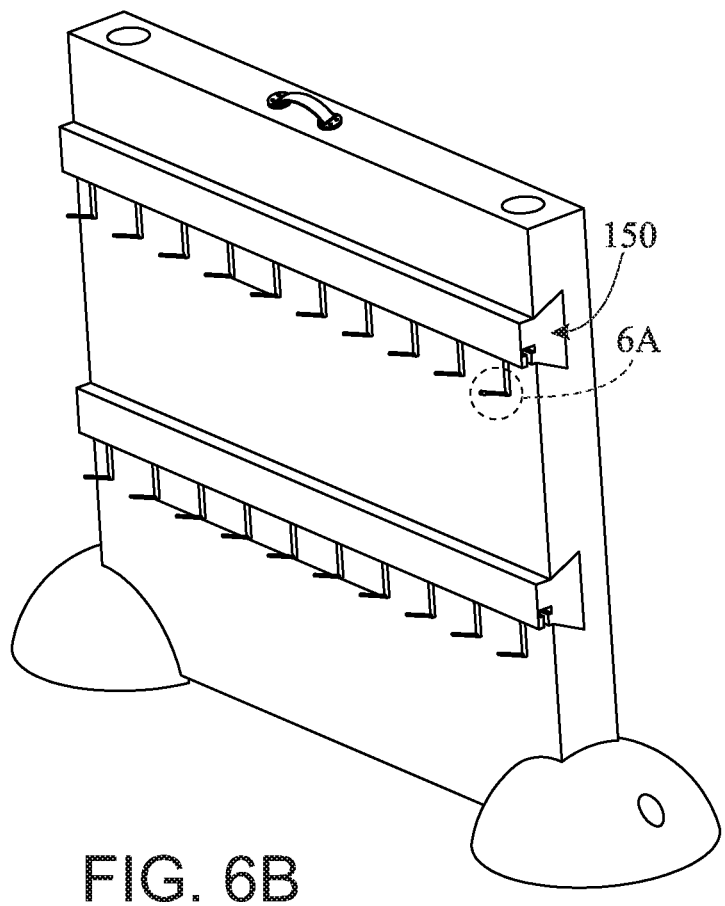
FIG. 6B presents a top-front-right isometric view of the adjustable fish-supporting photographic rack assembly shown in FIGS. 3-4.

As best seen in FIGS. 5 and 5A, each fish-supporting hook member 170 is sized, shaped and otherwise configured, for being slidably received into and through T-shaped channel 160. Each fish-supporting hook member 170 includes a shank 172, a fish-engaging cantilever portion 174, and an uppermost end 176. Uppermost end 176 of hook member 170 is sized and shaped to conform to upper hook-receiving portion 164 of T-shaped channel 160. Likewise, fish-supporting hook member shank 172 is sized and shaped to facilitate passage of the shank into and through lower hook-receiving portion 162 of T-shaped channel 160. Referring now particularly to FIG. 5A, during sliding passage of fish-supporting hook member 170 through T-shaped channel 160 hook member upper end 176 is bounded by the uppermost interior surface (not referenced in FIG. 5A) of upper hook-receiving portion 164, as well as shoulders 163 and main vertical sidewalls 165 of the upper hood-receiving portion. Likewise, shank 172 is partially bounded by main vertical sidewalls 161 of lower hook-receiving portion 162. A series of spaced-apart aligned pairs of slots 166, each defined by a pair of opposing vertical slot sidewalls 167 and lower supporting slot surface 168 spanning the sidewalls 167, are created in the corresponding opposed shoulders 163 to provide a series of positions along T-shaped channel 160 for selectively releasably locating each fish-supporting hook member 170. In this manner, the aforementioned configuration is beneficial in that it enables a user to define the quantity of hook members 170 to insert within T-shaped channel 160, as well as the desired spacing between each pair of adjacent hook members 170. Referring particularly to FIG. 6A, a hook tip protective sheath, coating or covering 175, may be provided for safety. As will be apparent to those skilled in the art, this arrangement and configuration provides a user with great flexibility depending upon the quantity and relative size of fish to be supported for the taking of a photograph, digital image or the like.

Referring now primarily to FIG. 2, a lower dovetail groove 130 defined by rear planar surface 132, upper tapered surface 134 and lower tapered surface 136 may likewise be provided for receiving a second lateral hook-supporting member 150 in precisely the same manner as described hereinabove with reference to upper dovetail groove 120. As will be apparent to those skilled in the art, although a pair of dovetail grooves 120, 130 is shown in the accompanying FIGS. 1-6 the invention is not intended to be so limiting. Thus, more or less such grooves may be employed as desired. This arrangement provides great flexibility to a user, since it enables the user to alter the number of fish-supporting hooks 170 as well as the spacing between hooks depending upon the size and quantity of the catch of fish being photographed.

Figure 7:
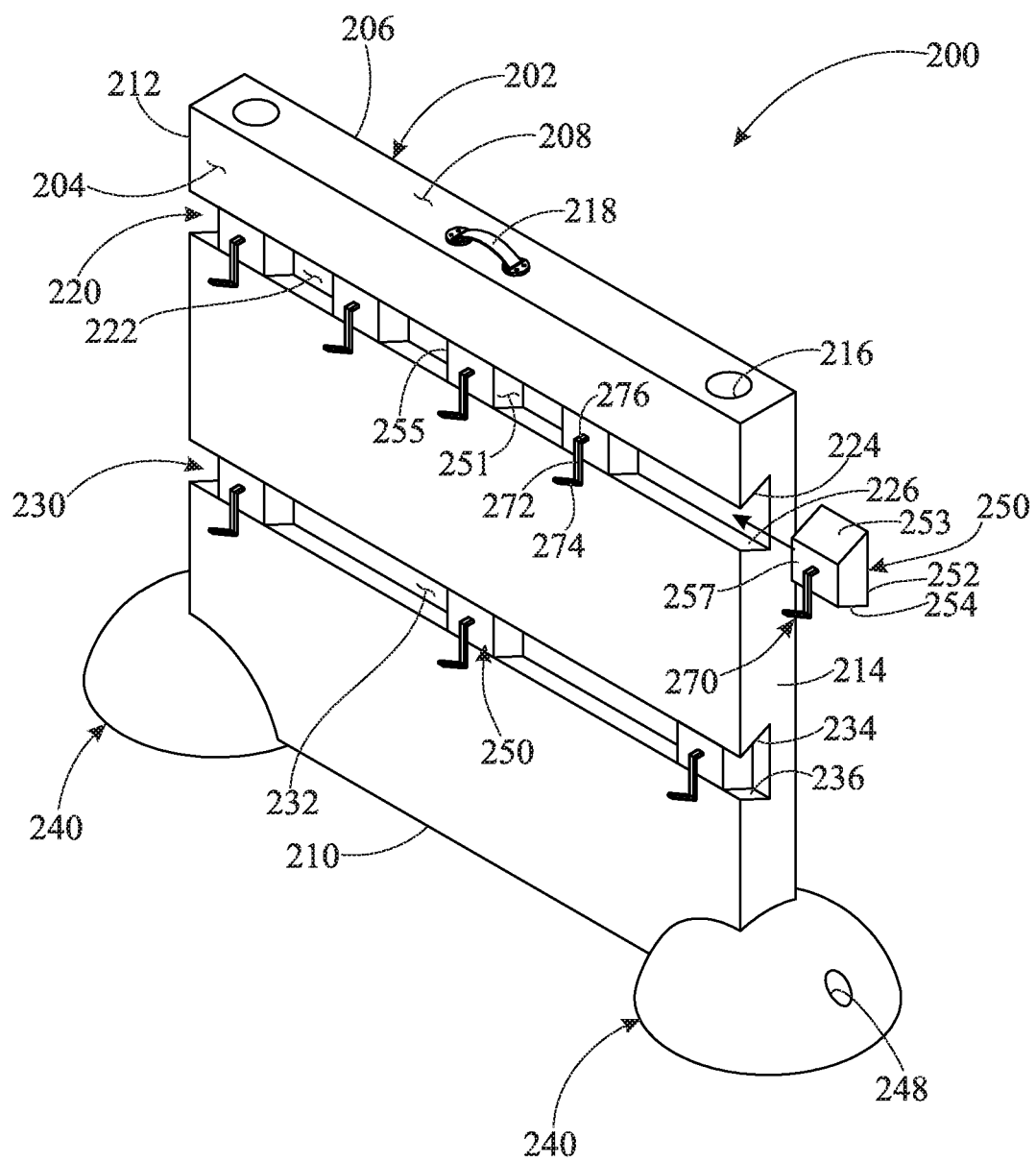
FIG. 7 presents a top-front-right perspective view of a second exemplary implementation of the adjustable fish-supporting photographic rack assembly of the present invention, illustrating the sliding insertion of individual hook-retaining blocks 250 into respective upper and lower laterally-extending dovetail grooves, 220 and 230.
Figure 8:
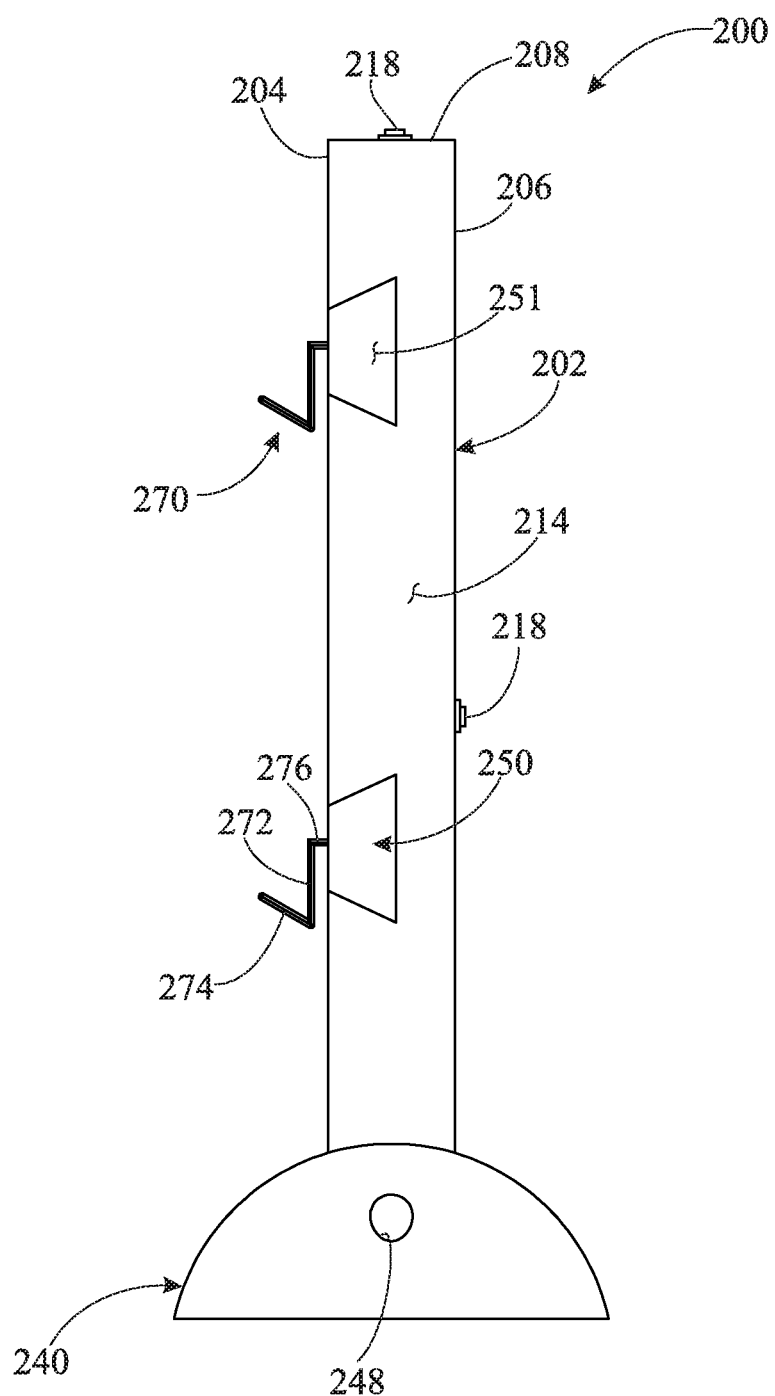
FIG. 8 presents a right side elevation view of the adjustable fish-supporting photographic rack assembly shown in FIG. 7 (in a fully assembled state)

Referring now primarily to FIGS. 7-8, in a further representative implementation, an adjustable fish-supporting photographic rack assembly 200 may be provided for use with a modified version of the lateral hook-supporting member 150 shown in FIGS. 1-6 and previously described hereinabove. Rack assembly 200 incorporates most of the features previously described with reference to the rack assembly 100 previously described. Rack assembly 200 includes a pair of supports 240 for securely maintaining main panel body 202 in an upright orientation. Each support 240 is preferably of identical structure to the supports 140 described hereinabove with reference to assembly 100, and each preferably includes at least one aperture 248 for the same intended purposes described hereinabove with regard to aperture 148 of support 140. Main panel body 202 is generally defined by front surface 204, rear surface 206, upper edge 208, lower edge 210, left edge 212, right edge 214, one or more handles 218, and upper edge apertures 216 (which may be used to support a mountable display apparatus such as display apparatus 180 shown in FIG. 1 and described in detail hereinabove with reference to assembly 100).

An upper dovetail groove 220 is provided integrated into front surface 204 running laterally between left edge 212 and right edge 214. The upper dovetail groove 220 is defined by a rear surface 222 a tapered upper surface 224 and a tapered lower surface 226. A similar lower laterally-extending dovetail groove 230 may be provided having a rear surface 232, an upper tapered surface 234, and a lower tapered surface 236. The upper and lower dovetail grooves, 220 and 230, respectively, are sized, shaped and otherwise configured for slidably receiving hook-supporting blocks 250, each having a geometry defined by rear planar surface 252, front planar surface 257, tapered upper surface portion 253, tapered lower surface portion 254, right side surface 251, and left side surface 255. A unitary hook-supporting hook member 270 may be provided extending outwardly, and depending downwardly, from front surface 257 of block member 250. Each fish-supporting hook member 270 preferably includes a shank 272, a fish-engaging cantilevered portion 274, and an upper length 276 fixedly secured to block 250. Preferably, upper length 276 is provided integrally molded to block 250. However, as will be apparent to those skilled in the art, alternate means for securing hook member 270 to block member 250 are possible and intended to be within the scope of the invention. For example, upper length 276 of hook member 270 could be provided having external threads configured for being threaded into a corresponding threaded cavity extending into front surface 257 of block member 250. Furthermore, upper length 276 could be affixed within a cavity extending into front surface 257 using an adhesive. Still further, upper length 276 could be provided with a mechanical feature configured for being snap-fitted into a cavity in front surface 257 having a corresponding mechanical feature for enabling selective snap-fit attachment of hook 270 to block 250.

Accordingly, when hook-supporting block 250 is slidably inserted, for example, into upper dovetail groove 220, hook-supporting block tapered upper surface portion 253 frictionally engages upper dovetail groove tapered upper surface 224, hook-supporting block tapered lower surface portion 254 frictionally engages upper dovetail groove tapered lower surface 226, and hook-supporting block rear planar surface 252 frictionally engages upper dovetail groove planar rear surface 222. Once hook-supporting block 250 is completely inserted into upper lateral dovetail groove 220, planar front surface 257 of block 250 is preferably substantially flush with front surface 204 of main panel body 202. Upper length 276 of hook 270 functions to provide clearance for shank 272 to depend downwardly in front of front surface 204.

Figure 9:
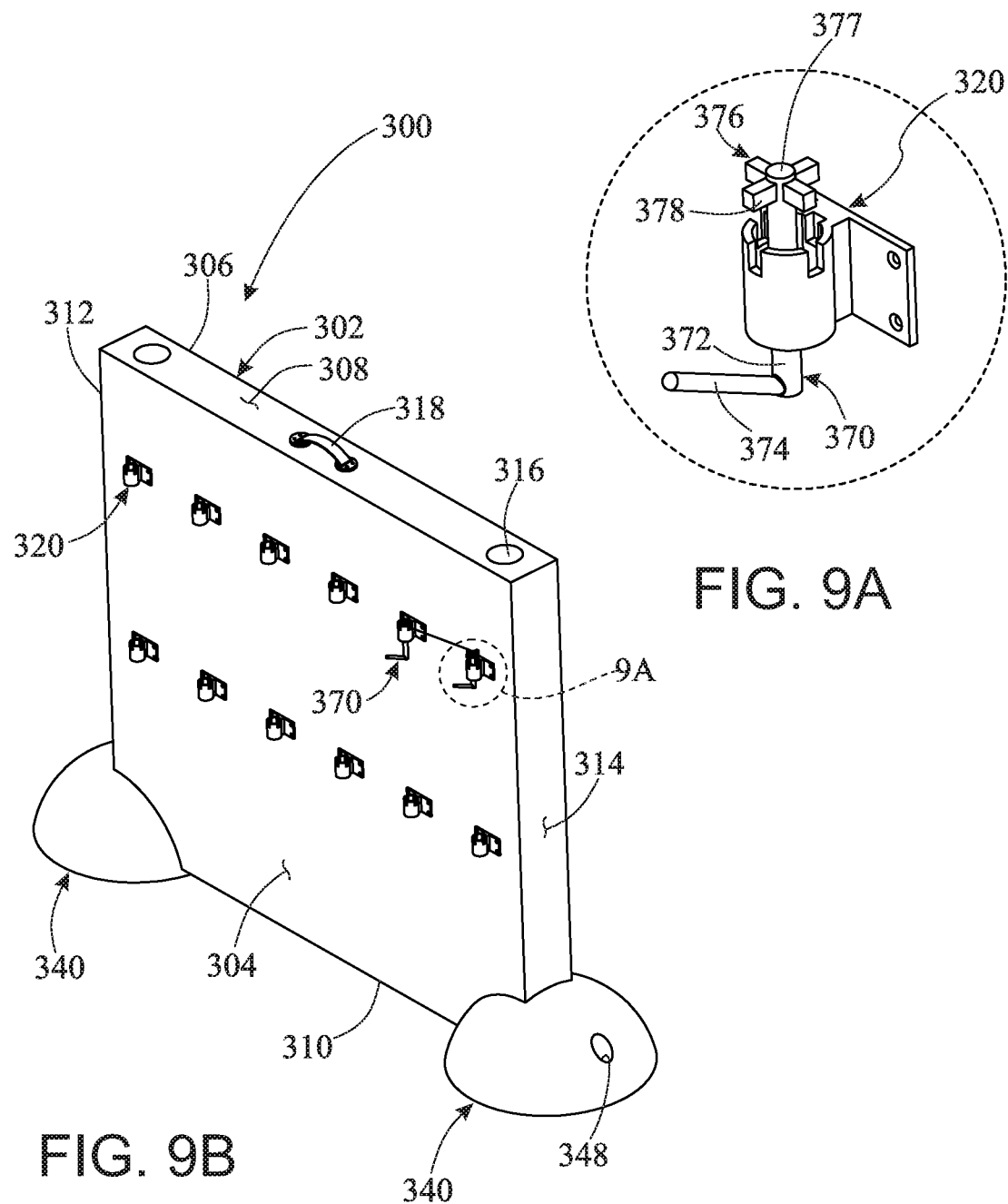
FIG. 9B presents a top-front-right perspective view of a third exemplary implementation of an adjustable fish-supporting photographic rack assembly in accordance with the invention.
FIG. 9A presents a magnified detailed view of the hook-supporting bracket member 320 shown in FIG. 9 (with unitary fish-supporting hook member 370 shown slightly raised for clarity)
Figure 10:
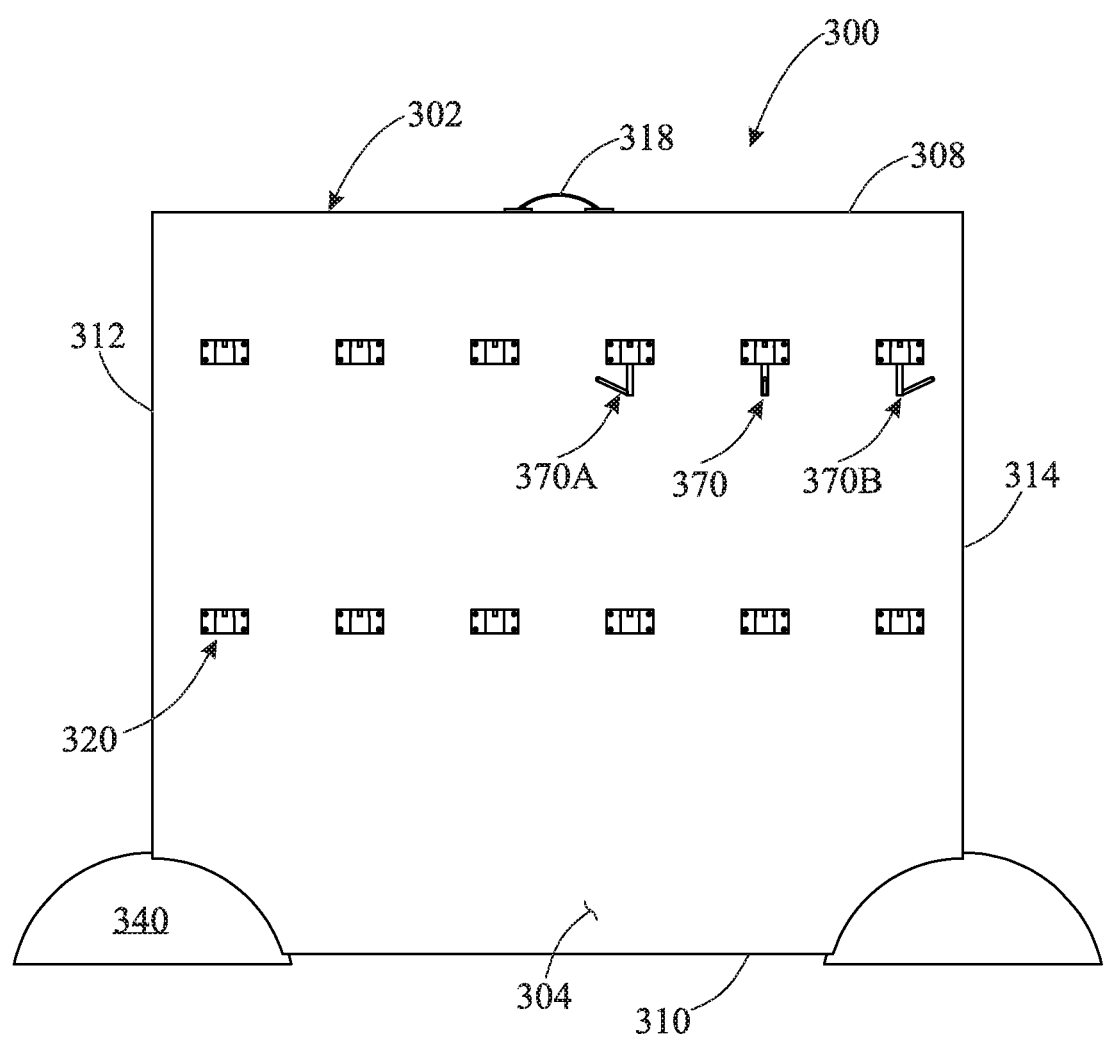
FIG. 10 presents a front elevation view of the adjustable fish-supporting photographic rack assembly shown in FIG. 9 (further including depictions of individual fish-supporting hook members 370 shown rotated to the left 370A and to the right 370B)
Figure 11:
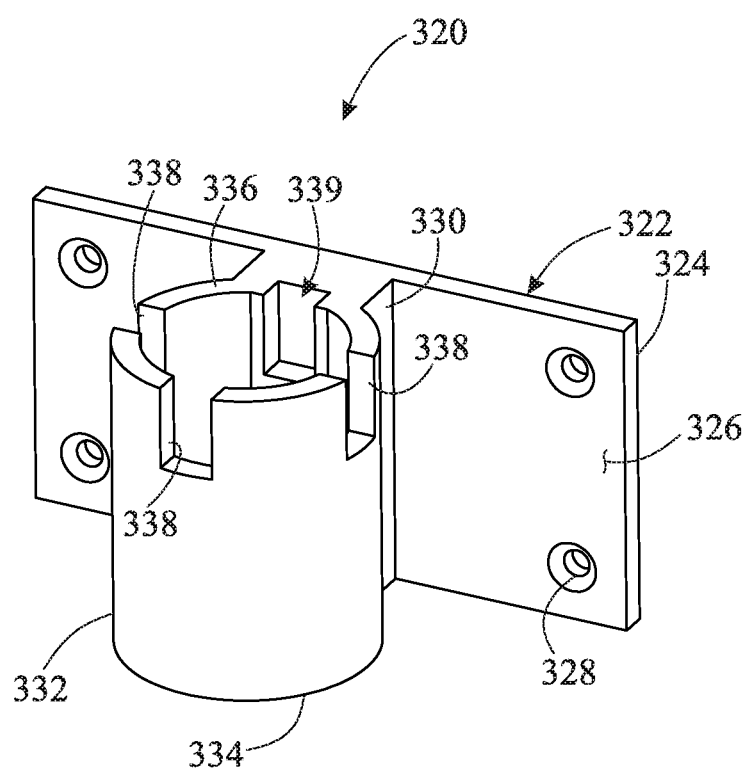
FIG. 11 presents an enlarged top-front-right isometric view of the hook-supporting bracket member 320 shown in FIGS. 9, 9A and 10.

Referring now particularly to FIGS. 9-11, in a further representative implementation, an adjustable fish-supporting photographic rack assembly 300 may be provided for use with a corresponding hook-supporting bracket member 320 and fish-supporting hook 370. Photographic rack assembly 300 incorporates most of the features previously described with reference to the rack assemblies 100 and 200, previously described. Rack assembly 300 includes a pair of supports 340 for securely maintaining main panel body 302 in an upright orientation. Each support 340 is preferably of identical structure to the supports, 140 and 240, described hereinabove with reference to respective assemblies 100 and 200, and each preferably includes at least one aperture 348 for the same intended purposes described hereinabove with regard to apertures 148 and 248 of supports 140 and 240. Main panel body 302 is generally defined by front surface 304, rear surface 306, upper edge 308, lower edge 310, left edge 312, right edge 314, one or more handles 318, and upper edge apertures 316 (which may be used to support a mountable display apparatus such as display apparatus 180 shown in FIG. 1 and described in detail hereinabove with reference to assembly 100).

Hook-supporting bracket member 320 is preferably of a unitary construction and includes a rear flange portion 322 having a rear flange surface 324 and a front flange surface 326, and a plurality of countersunk apertures 328 for receiving mechanical fasteners (not shown) therethrough to aid in securing bracket member 320 to front surface 304 of main panel body 302. A central transition portion 330 extends outwardly from front surface 326, bridging rear flange portion 322 with a main cylindrical hook-receiving side wall portion 332 of bracket member 320. Contiguous sidewall portion 332 has a lower edge 334 and an upper edge 336. Significantly, a plurality of upper edge features are preferably provided for enabling hook 370 to be securely seated through the bracket member 320 in multiple angular orientations, as further described below. In the exemplary implementation, the upper edge features are comprised of rectangular slot cutouts 338 in upper edge 336 in conjunction with rear rectangular depression 339 provided in central transition portion 330.

As best shown in FIG. 9A, a unitary fish-supporting hook 370 is provided having a shank 372, a fish-engaging cantilever portion 374 at a lower end thereof, and an upper structure 376 proximate a hook upper end 377 particularly configured for selective engagement with cutouts 338 and depression 339. In particular, upper portion 376 includes a plurality of angularly-spaced structural elements 378 sized, shaped and otherwise configured for being seated within the corresponding cutouts 338 and depression 339. Referring now particularly to FIG. 10 the aforementioned mating configuration of angularly-spaced structural elements 378 with corresponding angularly-spaced cutouts 338 and depression 339 enable a user to selectively rotate the hook from an operable, fish-supporting, orientation (depicted by reference numeral 370) to either a left-facing orientation 370A or a right-facing orientation 370B, when the hook is intended to be in a non-operable, or closed, orientation. Significantly, this enables a user to selectively rotate the hooks 370 depending upon which hook and bracket locations are desired to be used to support a catch of fish prior to taking a photographic image of the supported fish.

Referring now particularly to FIGS. 12 and 12A, in a further representative implementation, an adjustable fish-supporting photographic rack assembly 400 may be provided for use with a corresponding selectively-pivotable hook subassembly 420. Photographic rack assembly 400 incorporates most of the features previously described with reference to the rack assemblies 100, 200 and 300, previously described herein. Rack assembly 400 includes a pair of supports 440 for securely maintaining main panel body 402 in an upright orientation. Each support 440 is preferably of identical structure to the supports, 140, 240 and 340, described hereinabove with reference to respective assemblies 100, 200 and 300. Main panel body 402 is generally defined by front surface 404, rear surface 406, upper edge 408, lower edge 410, left edge 412, right edge 414, and one or more handles 418. In this exemplary representation, an alternative handle configuration is shown, wherein the handle 418 is provided as an integral opening extending completely through main panel body 402. As will be apparent to those skilled in the art, such an integral handle could be employed with any of the exemplary implementations in lieu of the carrying handle structure 118, 218 and 318, previously shown. Significantly, this particular implementation is intended to be of a relatively smaller-sized assembly—vis-à-vis the assemblies 100, 200 and 300, described heretofore—that is particular well-suited for use by young children. In this exemplary implementation, a plurality of cavities 416 is provided extending into the front surface 404. Although the cavities 416 are shown arranged in a matrix configuration, the invention should not be considered as limited to any particular cavity arrangement.

A plurality of selectively pivotable hook subassemblies 420 are provided seated within the respective cavities. Each pivotable hook subassembly 420 generally includes a support housing insert 430, a unitary pivotable fish-supporting hook member 440, and a hook support pin 438. Support housing insert 430 includes a rear housing portion 436 having a housing cavity 434. Preferably, the housing cavity opening is surrounded peripherally by an outwardly extending flange 432 having a pair of axially-aligned apertures extending transversely therethrough. Unitary pivotable fish-supporting hook member 440 preferably includes a thickened proximal end 442, a distal fish-engaging end 446, and a central portion 444 adjoining proximal and distal ends, 442 and 446. Preferably, central portion 444 transitions to distal fish-engaging end 446 via an upwardly curved transition portion 445. A transverse-oriented, or lateral, channel 447 is provided extending completely through thickened proximal end 442.

During assembly of the pivotable hook subassembly 420, thickened end 442 of fish-supporting hook member 440 is inserted into front receiving cavity 434 of support housing insert 430 until hook channel 447 is in axial alignment with the apertures 437 of the support housing insert. Subsequently, hook support pin 438 is inserted completely through a first one of the flange apertures 437, through a first end of hook channel 447, and through (or into) a second one of the flange apertures 437. In this manner, fish-supporting hook member 440 is pivotably secured for selective rotation about hook support pin 438. A torsion spring (not shown, but well understood in the art) is integrated within subassembly 420 in order to rotationally bias hook member 440 completely into cavity 434 of support housing insert 430. As will be apparent to those skilled in the art, the precise structure of pivotable hook subassembly 420 is not intended to be limiting. For example, in lieu of pin 438 and housing insert apertures 437 it is contemplated to provide a pair of integral nubs on the interior surface of support housing insert 430, extending into cavity 434, at the same locations as apertures 437. In this manner, hook member 440 could be snap-fittingly engaged to support housing insert 430.

Figure 13:
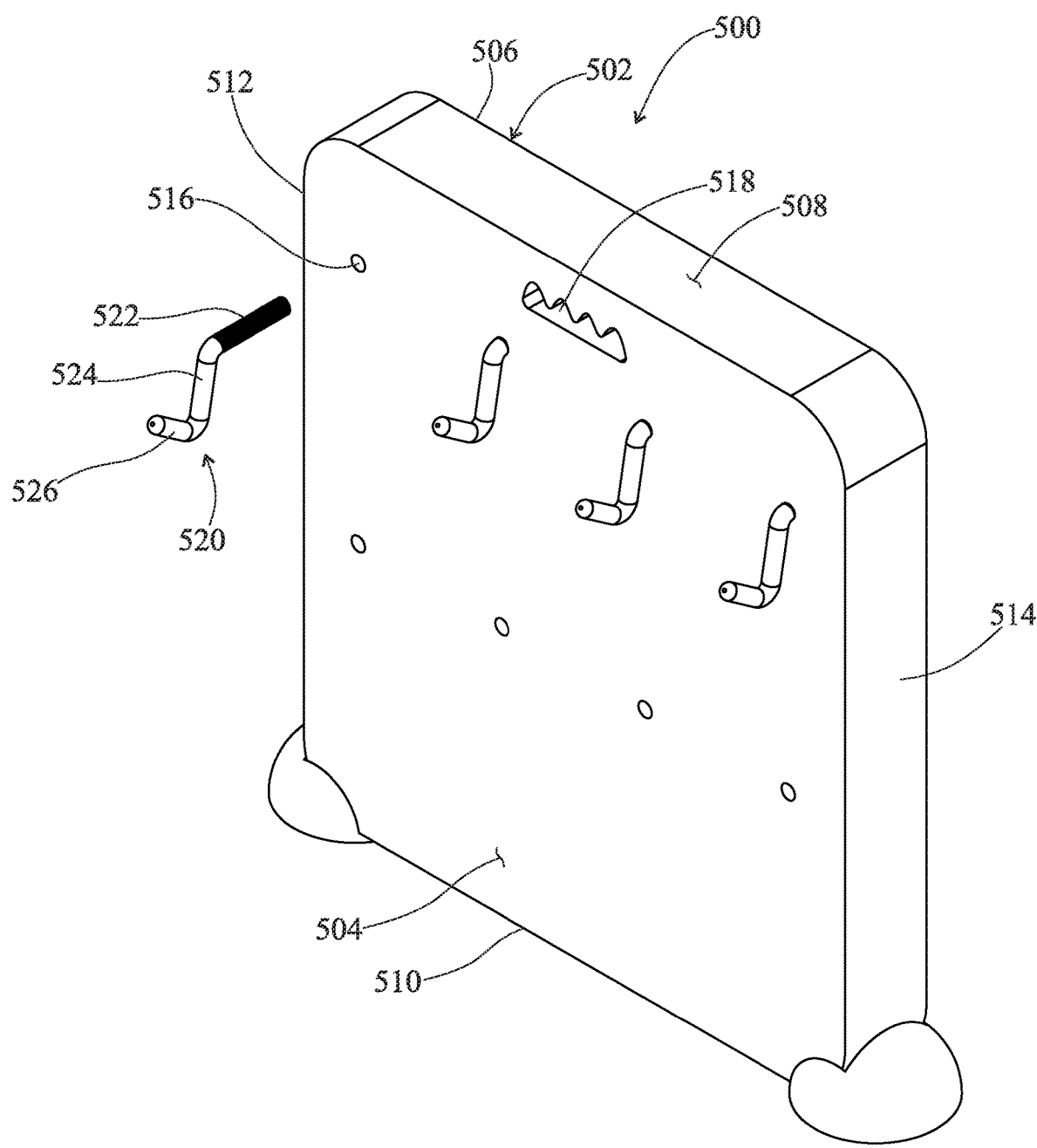
FIG. 13 presents a top-front-right isometric view of a fifth exemplary implementation of an adjustable fish-supporting photographic rack assembly in a partially assembled state.

Referring now to FIG. 13, in a further representative implementation, an adjustable fish-supporting photographic rack assembly 500 may be provided for use with a corresponding plurality of unitary fish-supporting hook members 520. Photographic rack assembly 500 incorporates most of the features previously described with reference to the rack assemblies 100, 200, 300 and 400, previously described herein. Rack assembly 500 may include a pair of supports 440 for securely maintaining main panel body 502 in an upright orientation. Each support 540 is preferably of identical structure to the supports, 140, 240, 340 and 440 described hereinabove with reference to respective assemblies 100, 200, 300 and 400. Main panel body 502 is generally defined by front surface 504, rear surface 506, upper edge 508, lower edge 510, left edge 512, right edge 514, and one or more handles 518. A plurality of internally-threaded hook-receiving apertures 516 are provided extending into front surface 504 of main panel body 502. Each fish-supporting hook member includes an externally-threaded length 522, a fish-engaging cantilever portion 526, and a shank 524 therebetween. In use, one or more fish-supporting hook members 520 may be threadingly inserted into one or more of the internally threaded apertures 516. As will be apparent to those skilled in the art, the arrangement of internally-threaded apertures 516 may be provided in any desired configuration. Thus, the spacing between apertures and the relative location of the apertures is not intended to be limiting. Furthermore, different-sized hooks 520 may be used depending upon the size and weight of the catch of fish intended to be supported prior to the taking of a photograph, digital image or the like.

Figure 14:
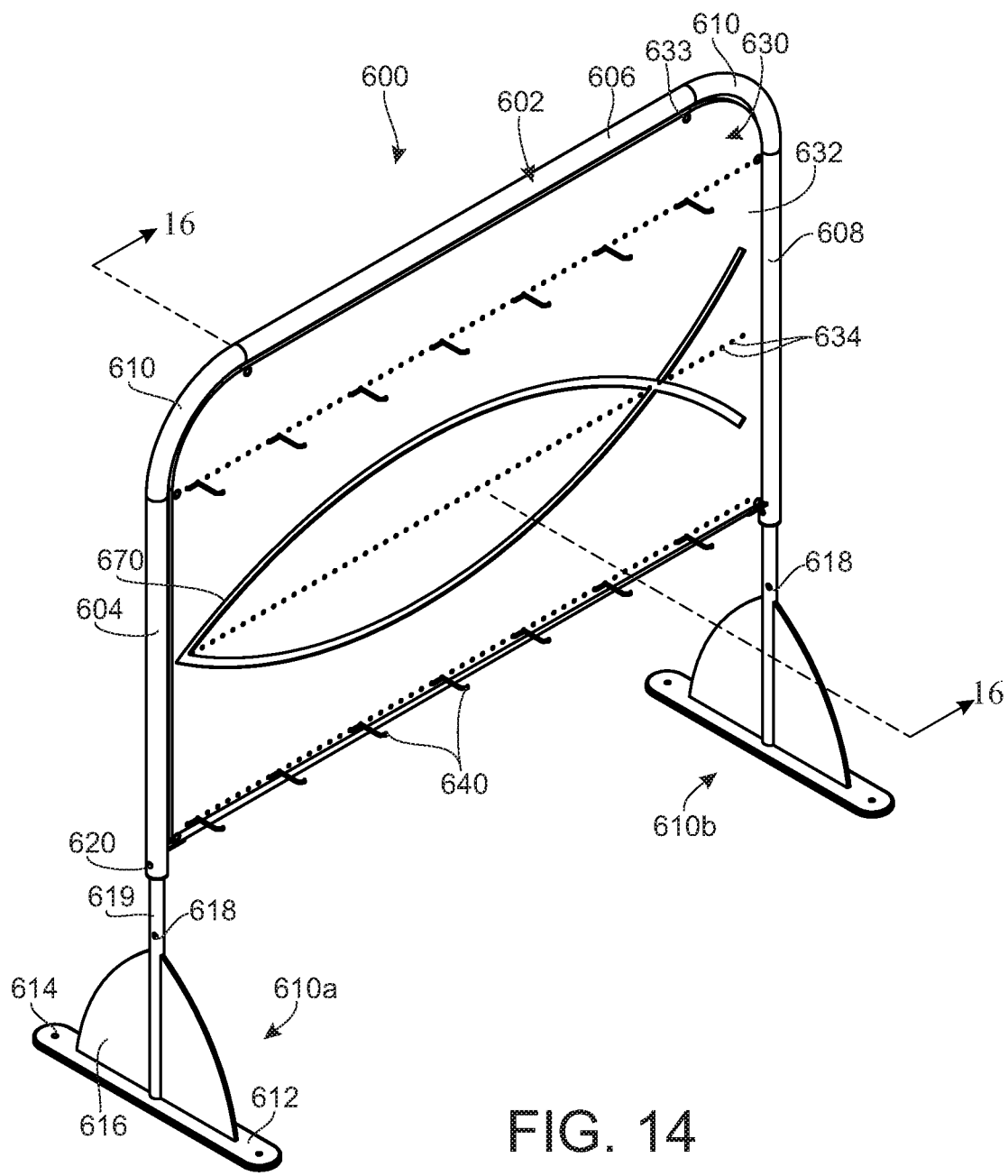
FIG. 14 presents a top-front-left isometric view of a sixth exemplary implementation of an adjustable fish-supporting photographic rack assembly in an assembled state.
Figure 15:
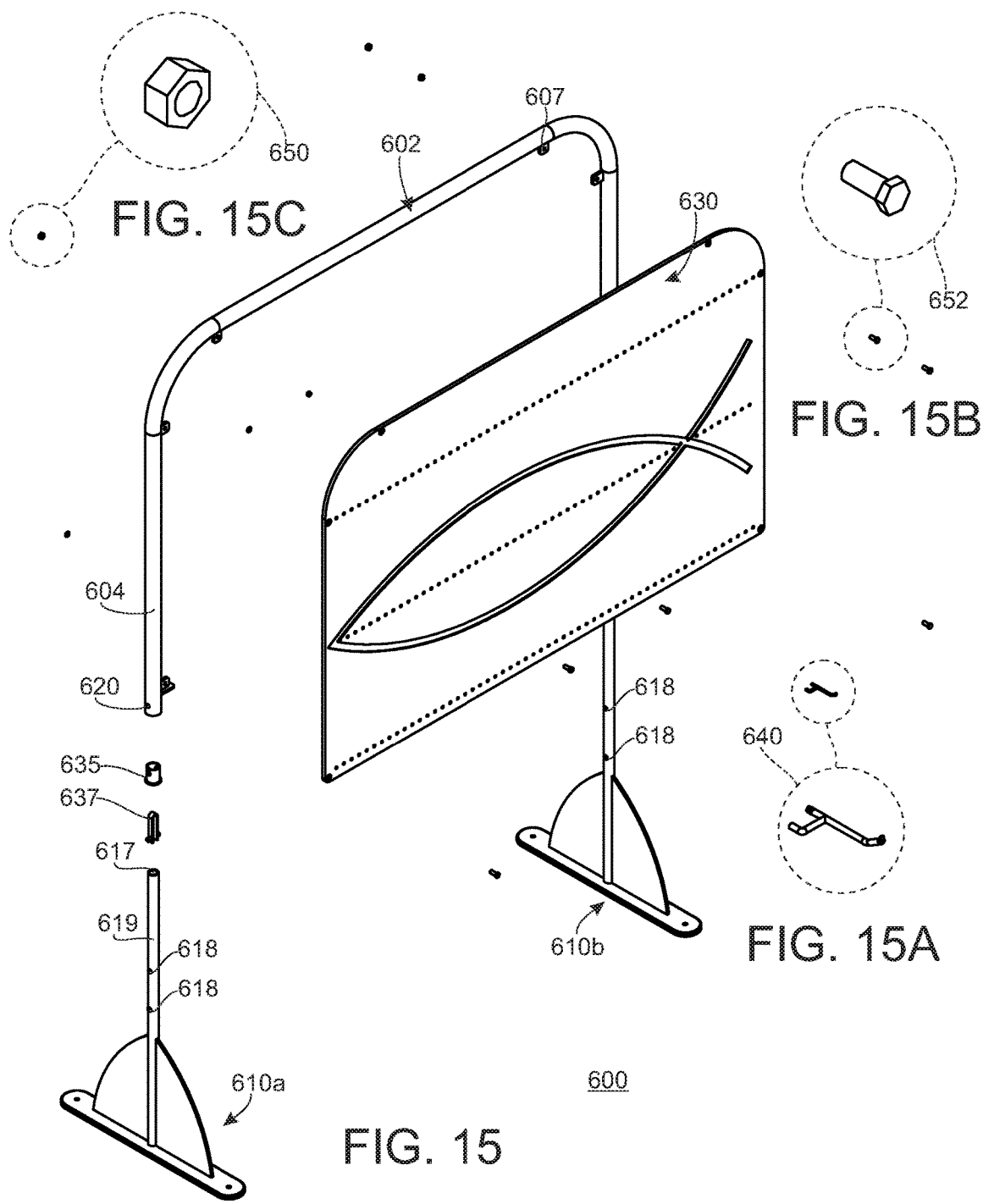
FIG. 15 presents a partially exploded view of the fish-supporting photographic rack assembly shown in FIG. 14.

Referring now to FIGS. 14-20, in accordance with a further representative implementation of the present invention, an adjustable fish-supporting photographic rack assembly is shown generally as reference numeral 600. Rack assembly 600 includes a stanchion rack framework subassembly 602 having a horizontal segment 606, a pair of upper curved segments 610, and a pair of vertical segments 604, 608. The upper curved segments 610 adjoin opposite ends of horizontal segment 606 with downwardly-depending vertical segments 604, 608, respectively. As previously stated hereinabove, as will be apparent to those skilled in the art, although the framework 602 of the rack 600 is shown having a particular framework-based stanchion geometry, alternate framework geometries may be employed without departing from the scope of the invention. For instance, the framework 602 geometry could be altered to form an arched top by substituting a curved upper segment for linear horizontal segment 606. Furthermore, although it is contemplated that the rack 600 be made out of metal, alternative materials such as, for example, thermoplastics, or durable composite polymers may be employed. As is best shown in FIG. 15, tabs 607 with apertures may be included on the inward facing portions of the segments forming the framework 602 for removably attaching a central panel 630 thereto. As shown, the central panel 630 may include a plurality of apertures 634 in the form of a series of horizontal rows 636a, 636b, and 636c. The central panel 630 may also include a design element 670 on its surface 632. For example purposes only, and in no way to be considered limiting, a design element 670 may be etched on to the surface 632 of the central panel into the shape of a fish (as depicted in FIG. 14). It should be readily understood that alternative shapes and/or designs may be employed and displayed through different mediums (e.g. stickers, paintings, etc.) on the panel 630 if desired.

Figure 17:
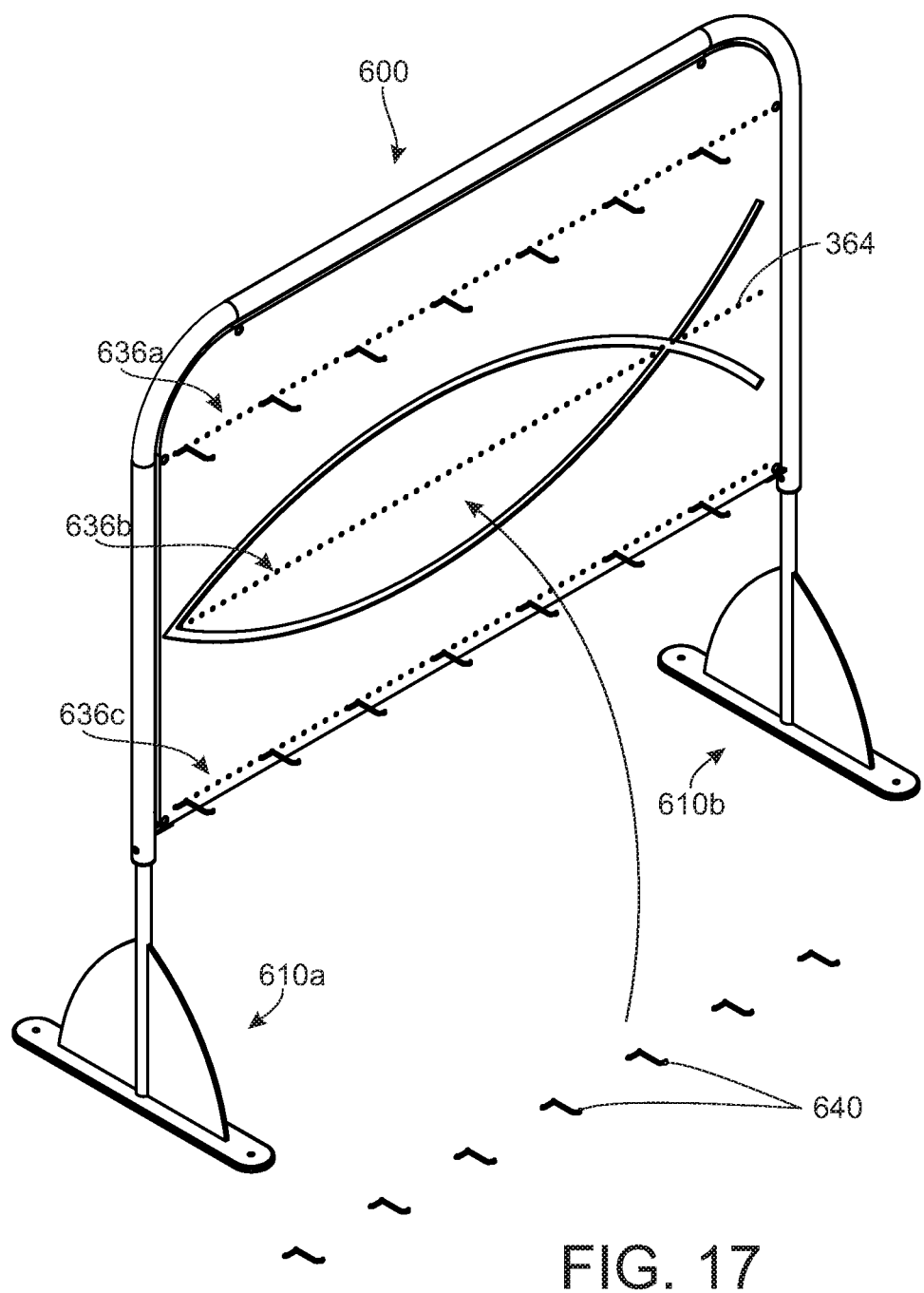
FIG. 17 presents a top-front-left isometric view of the sixth exemplary implementation of the adjustable fish-supporting photographic rack assembly introduced in FIG. 14 in a partially assembled state.
Figure 20:
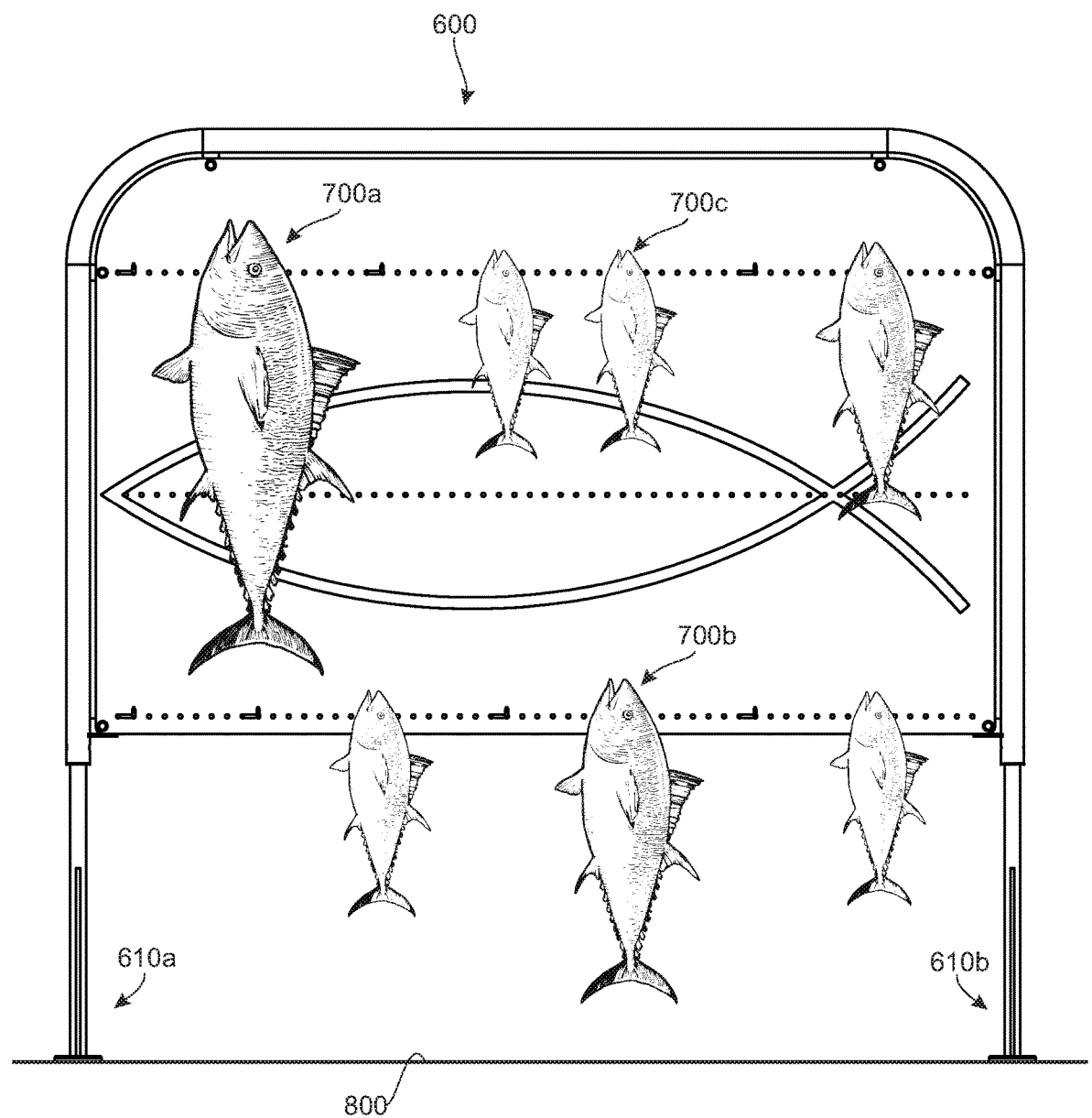
FIG. 20 presents a top-front-left isometric view of the sixth exemplary implementation of the adjustable fish-supporting photographic rack with a variety of fish hanging from hook member 640.

Referring primarily to FIGS. 14, 15 and 17, first and a second support bases, 610a and 610b, respectively, are provided configured to receive distal end portions of the pair of vertical segments 604, 608 into the corresponding openings 617 of the support bases 610a, 610b for securely maintaining the framework 602 of the rack 600 in an upright position. Each support base 610a, 610b has a geometry, or configuration, to minimize the risk of the rack assembly 600 tipping over and injuring someone. Each support base 610a, 610b may be defined by a planar base 612 having, for example, an elliptical shape and at least a pair of apertures 614 at opposite ends thereof to selectively affix the rack assembly 600 to a ground support surface 800 (as shown in FIG. 20). As can be best understood to one of ordinary skill, alternative base configurations may be employed without departing from the scope of the invention. Projecting upwardly from the base portion 612 of each respective support base 610a, 601b is an interconnecting plate 616 in the form of a wedge widest at the bottom and narrowing in an upward direction. Integrated at the middle of the interconnecting plate 616 projecting upwardly and perpendicularly from a mid-portion of the base plate 612 is a vertical connector tube 619 having an opening 617 at its upper end for selectively receiving a distal end portion of one of the vertical segments 604, 608 of framework 602. As best shown in FIGS. 14 and 15, when mating the framework 602 to the base supports 610a, 610b of the rack assembly 600, the distal end portions of the vertical segments 604, 608 of the framework 602 are inserted into the respective openings 617 of the base supports 610a, 610, with an interposed bushing 635 used to prevent metal-to-metal contact, for example, in the case where a metal material is used to construct the rack assembly 600. A dual spring clip 637 is inserted into each one of the upper openings of the vertical segments 604, 608, for engagement with the apertures 618 on the respective vertical support tubes 619 to enable selective adjustment of the overall height of the rack assembly 600 to a desired height.

Figure 16:
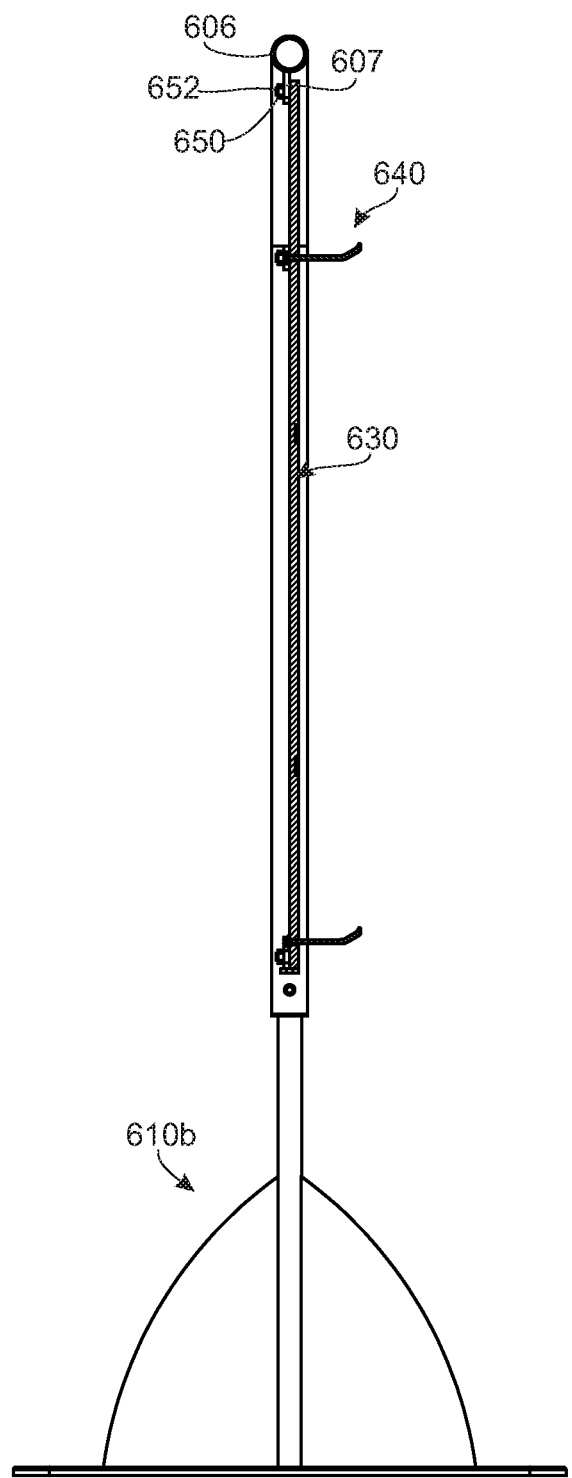
FIG. 16 presents a longitudinal cross-sectional planar view of the fish-supporting photographic rack assembly taken along line 16-16 as shown on FIG. 14.
Figure 18:
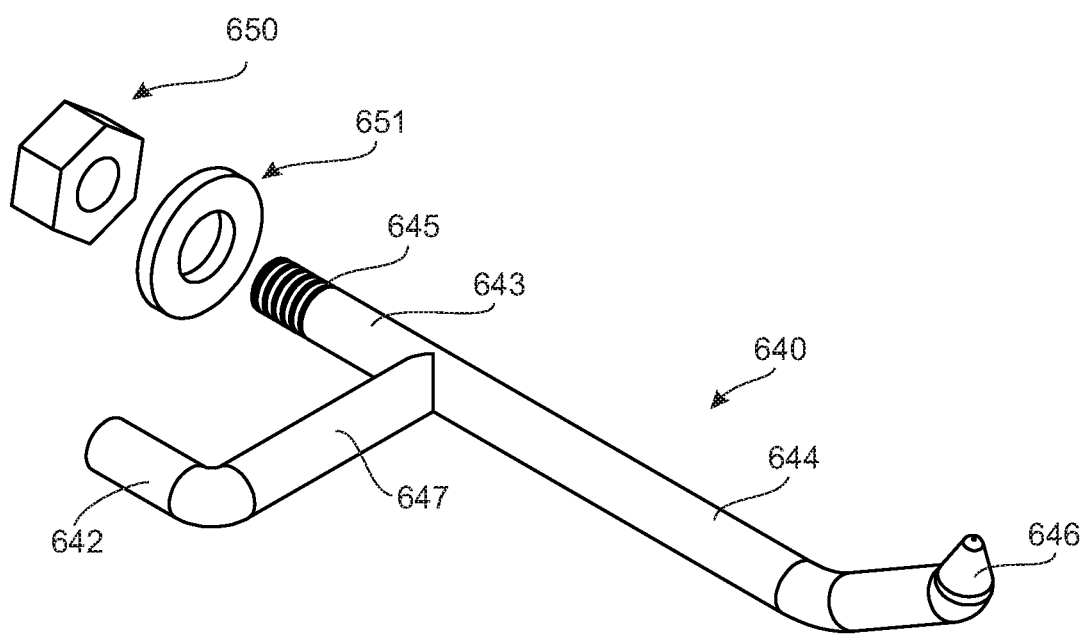
FIG. 18 presents an enlarged view of the hook member 640 as shown on FIGS. 14-17.

Turning now to FIG. 18, a hook member generally assigned reference numeral 640 is provided. The hook member 640 is sized, shaped, and otherwise configured, to be inserted simultaneously into two adjacent apertures of the series of apertures 634 defining horizontal aperture rows 363a, 363b, and 363c (shown in FIGS. 14, 15 and 17-20). Each hook member 640 includes a main linear portion 644 transitioning to a semi-curved distal end 646, and terminating at a proximal end 643 that is externally threaded 645. The distal end 646 of the hook 640 may include a protective sheath, coating or covering for safety. Extending perpendicularly from hook's proximal end is a hook length portion 647 terminating at an elbowed end 642 that extends adjacent to the hook's main portion and terminates just short of the corresponding hook proximal end 643. Referring briefly to FIG. 16, during installation of the hook member 640 to the rack assembly 600, the proximal end portion 643 of the hook's main portion 644 and the adjacent parallel projecting elbow end portion 642, together, are selectively inserted into a pair of adjacent apertures provided on the front face 632 of the central panel 630. When both proximal ends 642, 645 of the hook 640 are inserted into corresponding adjacent apertures, a portion of the hook's threaded portion 645 is exposed on the opposite side of the front face 632 of the central panel 630 (i.e. the threaded portion extends completely through the panel body 632. In this manner, the hook 640 can then be securely fastened by inserting a washer 651 and threading a nut 650 on to the exposed external threaded portion 645 of the hook 640. It will be readily understood that each respective hook attached and fastened to the racks central panel 630 can be detached and relocated to a different location on the panel. Once securely fastened to the central panel 630, each hook 640 is configured to carry the relatively large load of a hanging fish without yielding.

Figure 19:
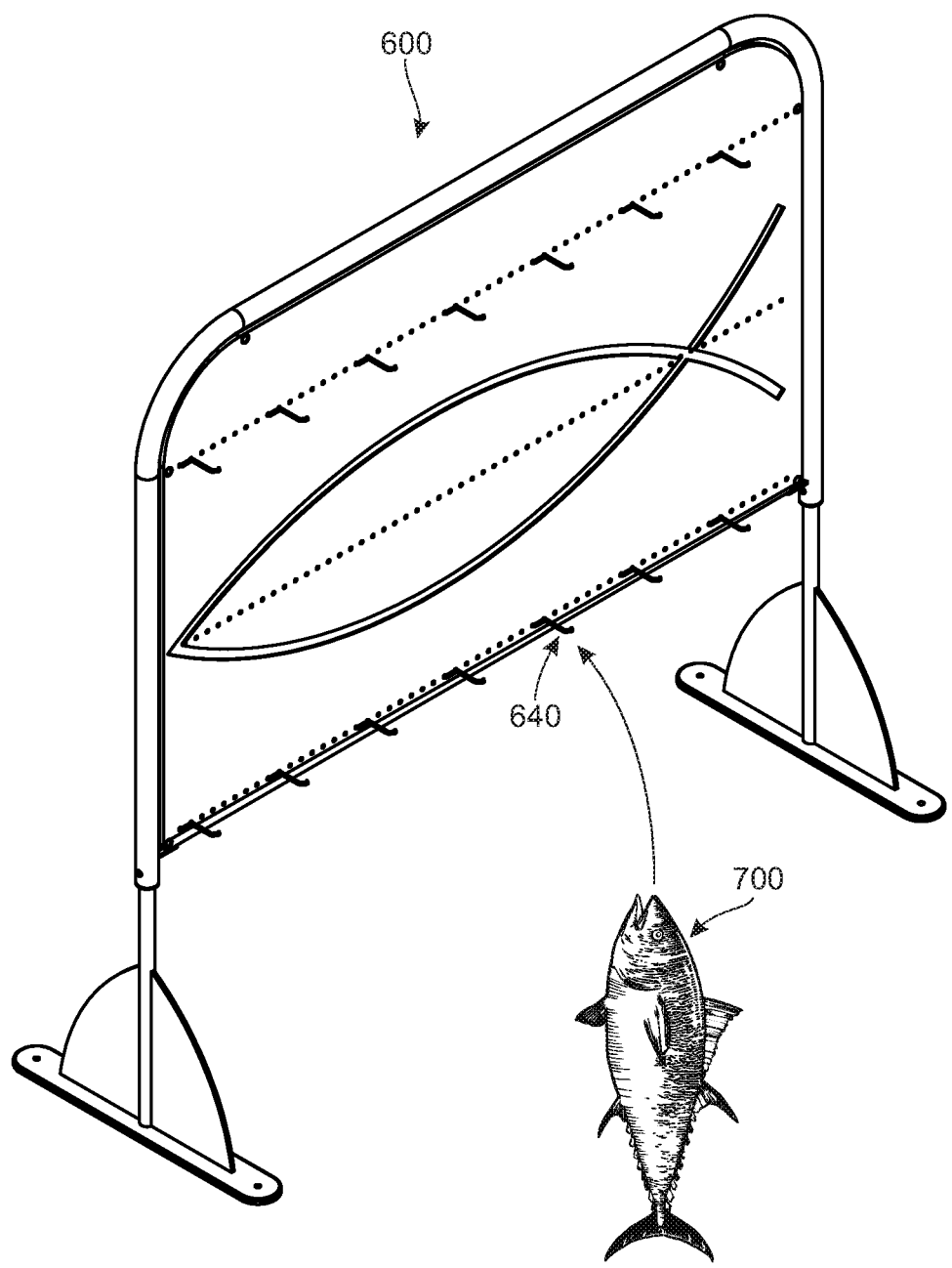
FIG. 19 presents a top-front-left isometric view of the sixth exemplary implementation of the adjustable fish-supporting photographic rack.

Referring now to FIGS. 19 and 20, when fully assembled, rack 600 may be used to hold a variety of fish species of varying weights and sizes (e.g. small 700c, medium 700b, and large 700a). As will be apparent to those skilled in the art, the arrangement of the bored apertures 634 may be provided in any desired configuration. Thus, the spacing between apertures and the relative location of the apertures is not intended to be limiting. Furthermore, different-sized hooks 640 may be used depending upon the size and weight requirements of the catch of fish intended to be supported prior to the taking of a photograph, digital image or the like.

Figure 21:
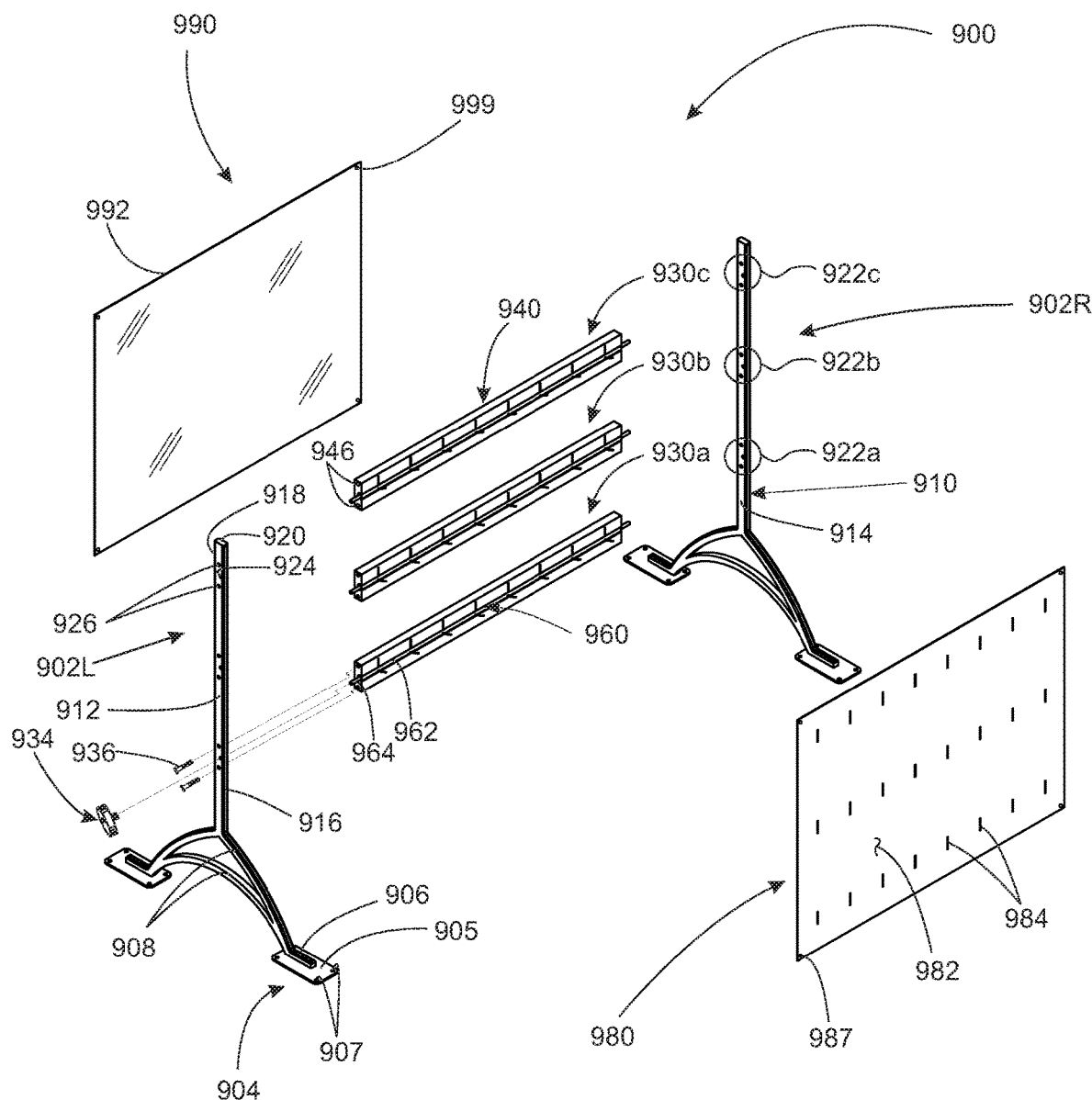
FIG. 21 presents a top-front-left isometric view of a seventh exemplary implementation of an adjustable fish-supporting photographic rack assembly in an exploded state (with the exception of rotating hook rod 960, which is shown seated within retaining panel 940)

Referring now particularly to FIGS. 21-26a, in accordance with a further exemplary implementation of an adjustable fish-supporting photographic rack assembly 900 in accordance with the present invention. As best shown in FIG. 21, the rack assembly 900 generally includes: (a) a pair of spaced-apart left and right support stanchion, 902L and 902R, respectively; (b) a plurality of hook rod-retaining cross member subassemblies 930a, 930b, 930c, each including a selectively-rotatable hook rod 960 rotatably seated within a hook rod retaining cross member body 940; a front protective display panel 980; a rear protective display panel 990; and an optional upper cover strip 995 (see FIG. 22).

Figure 26:
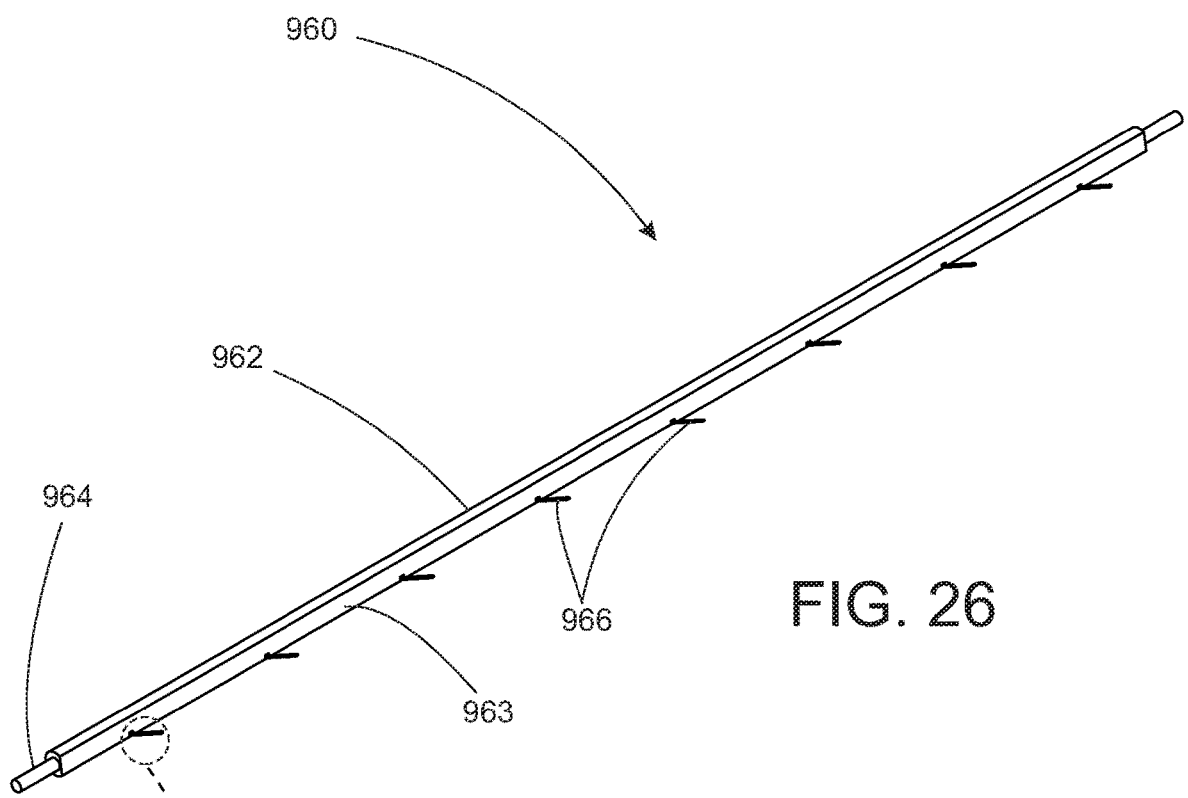
FIG. 26 presents a top-front-left isometric view of a rotating hook rod in accordance with the present invention.
Figure 26A:
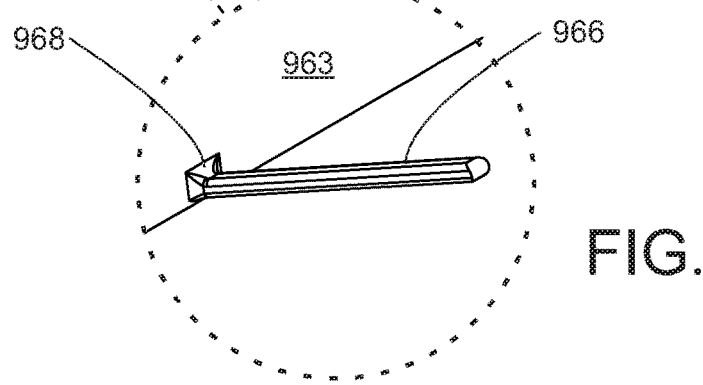
FIG. 26a presents a magnified view of an individual fish-hanging hook 966 welded to a flat surface portion 963 of rotating hook rod main body 962 in accordance with the present invention.

Preferably, each stanchion 902L, 902R is in the form of a rigid metal framework constructed, for example, of powder-coated aluminum members, or the like. Each stanchion 902L, 902R may include a pair of stanchion support feet subassemblies 904 provided in the form of stanchion feet 906 directly welded (or otherwise fastened) to planar stabilizing plates 905. The stabilizing plates may include apertures 907 for receiving mechanical fasteners (not shown), such as concrete screws or the like, for securely attaching the stanchions 902L, 902R into a ground support surface, such as a concrete slab, wood dock, etc. Each stanchion 902L, 902R may include a vertical stanchion body portion, or length, shown generally as 910, and an intermediate metal framework portion 908 adjoining the stanchion feet 906 and the vertical stanchion body portions/lengths 910. Preferably, each vertical stanchion body length 910 is further defined by an exteriorly-facing, or outer-facing, side 912, an interiorly-facing, or inner-facing, side 914, a front edge 916, a rear edge 918, and an upper distal end 920. Each vertical stanchion body length 910 may further include a lowermost series of stanchion apertures 922a, an uppermost series of stanchion apertures 922c, and at least one intermediate series of stanchion apertures 922b. Each series of stanchion apertures preferably includes a pair of apertures 926 extending therethrough and aligned with a corresponding pair of apertures 946 extending into the opposite left and right ends, 944 and 945, respectively, of hook rod retaining cross member 940, such that mechanical fasteners may be employed for fixedly attaching each end of cross member 940 to the corresponding vertical stanchion body length of the respective left and right stanchions 902L, 902R. Furthermore, each series of stanchion apertures 922a, 922b, 922c preferably includes a center aperture 924 sized, shaped, and otherwise configured for receiving one of the opposite distal end portions 964 of main body 962 of selectively-rotatable hook rod 960 therethrough. As best shown in FIGS. 26 and 26A, hook rod distal end portions 964 may have a reduced cross-sectional diameter, or area, vis-à-vis rod main body 962.

Referring now particularly to FIGS. 26 and 26A, a selectively-rotatable hook rod 960 may include a main body 962 having a generally cylindrical geometry. Although hook rod main body 962 is preferably of a generally cylindrical geometry, a flat surface portion 963 (or, alternatively, a series of spaced flats) may be provided for facilitating a secure weld attachment 968 (FIG. 26A) of each of a series of spaced-apart hooks 966 to the hook rod main body. Alternatively, it is contemplated to use a completely cylindrical rod main body having a series of depressions provided therein for facilitating attachment of the hooks 966, such as by welding, to a cylindrical rod surface. Significantly, it is preferred that the hooks 966 are fixed to the hook rod main body 962 at a relative orientation (for example, to main rod flat portion 963) such that they remain at an upward angle of approximately fifteen degrees (15°) to a horizontal plane when the hook rod 960 is rotated into an extended, deployed position for holding fish. The slight upward taper acts to prevent fish attached to the hooks from undesirably sliding off without the aid of an individual. Preferably, the individual hook bodies 966 are also constructed from a rigid metal such as, for example, powder-coated aluminum rod segments.

Figure 25:
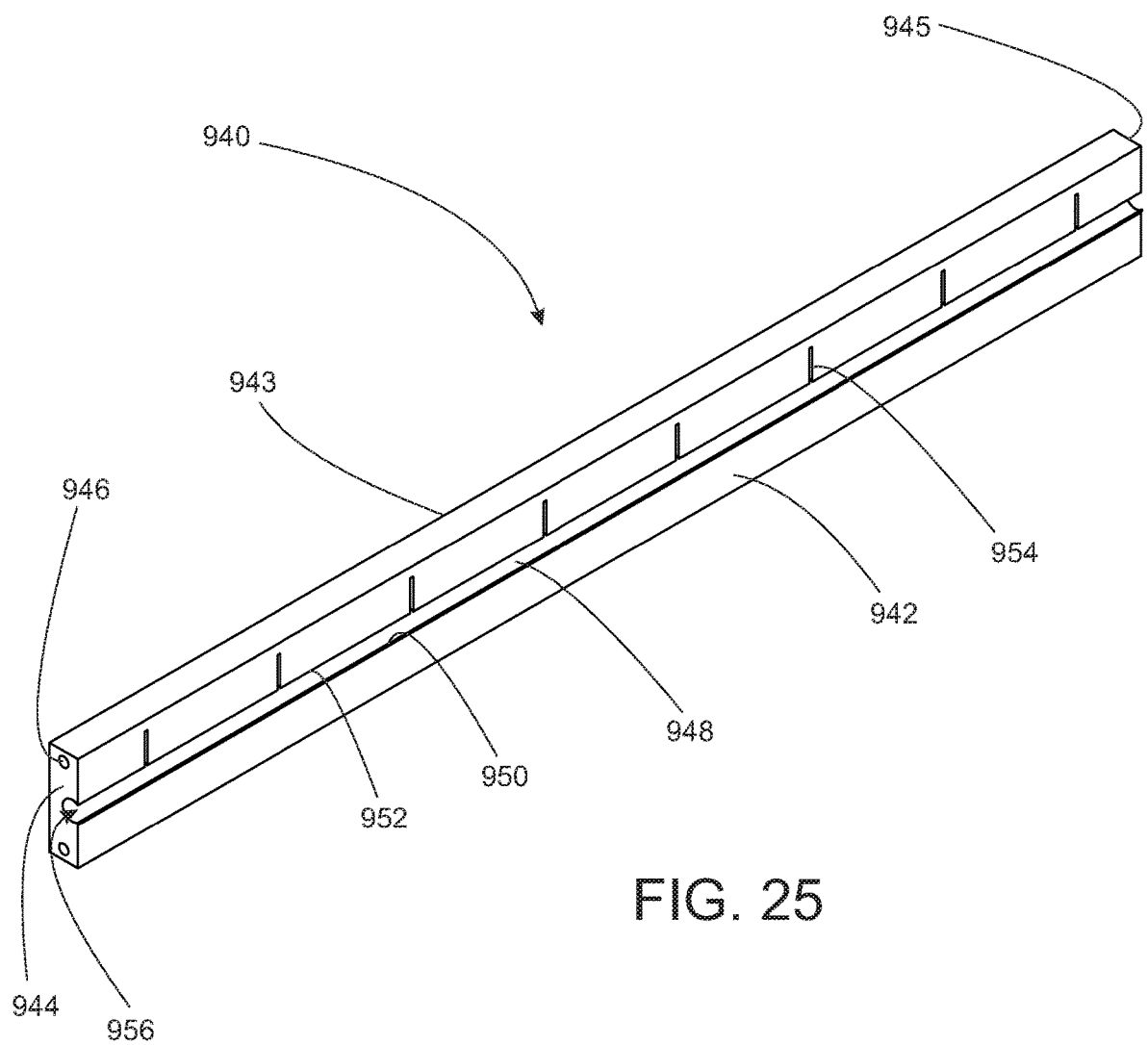
FIG. 25 presents top-front-left isometric view of a hook rod-retaining lateral beam in accordance with the present invention.

Referring now primarily to FIG. 25, the structure of hook rod retaining cross member 940 is shown in more detail. The cross member 940 is generally bounded by a front side 942, an opposite rear side 943, a left end 944, and an opposite right end 945. The cross member 940 is further defined by a C-shaped channel extending laterally across its entire length and through front side 942 to define a cross member front side channel opening extending between a lower channel lip 950, or edge, and an upper channel lip 952, or edge. Access to the channel 948 is further provided through lateral access openings 956 at the opposite ends, 944, 955 of the cross member. Significantly, a series of spaced-apart hook retention recesses 954 extend into front side 942 for receiving the corresponding spaced-apart hook bodies 966 of hook rod 960 when the hook rod is selectively rotated into a retracted, non-deployed position. As described briefly hereinabove, a pair of fastener-receiving apertures 946 may be provided extending into the opposite ends 944, 945 of the cross member body for facilitating secure attachment of each cross member 940 extending laterally between the left and right support stanchions when the adjustable fish-supporting photographic rack assembly 900 is in a fully assembled state. Preferably, the hook rod retaining cross members 940a, 940b, 940c are constructed from a light-weight marine grade rigid polymer having excellent dimensional stability, machinability and high mechanical strength, such as an acetal homopolymer. Various commercially available acetal homopolymer are sold under various tradenames, including DELRIN, HOSAFORM, DURACON, and CELCON.

Figure 22:
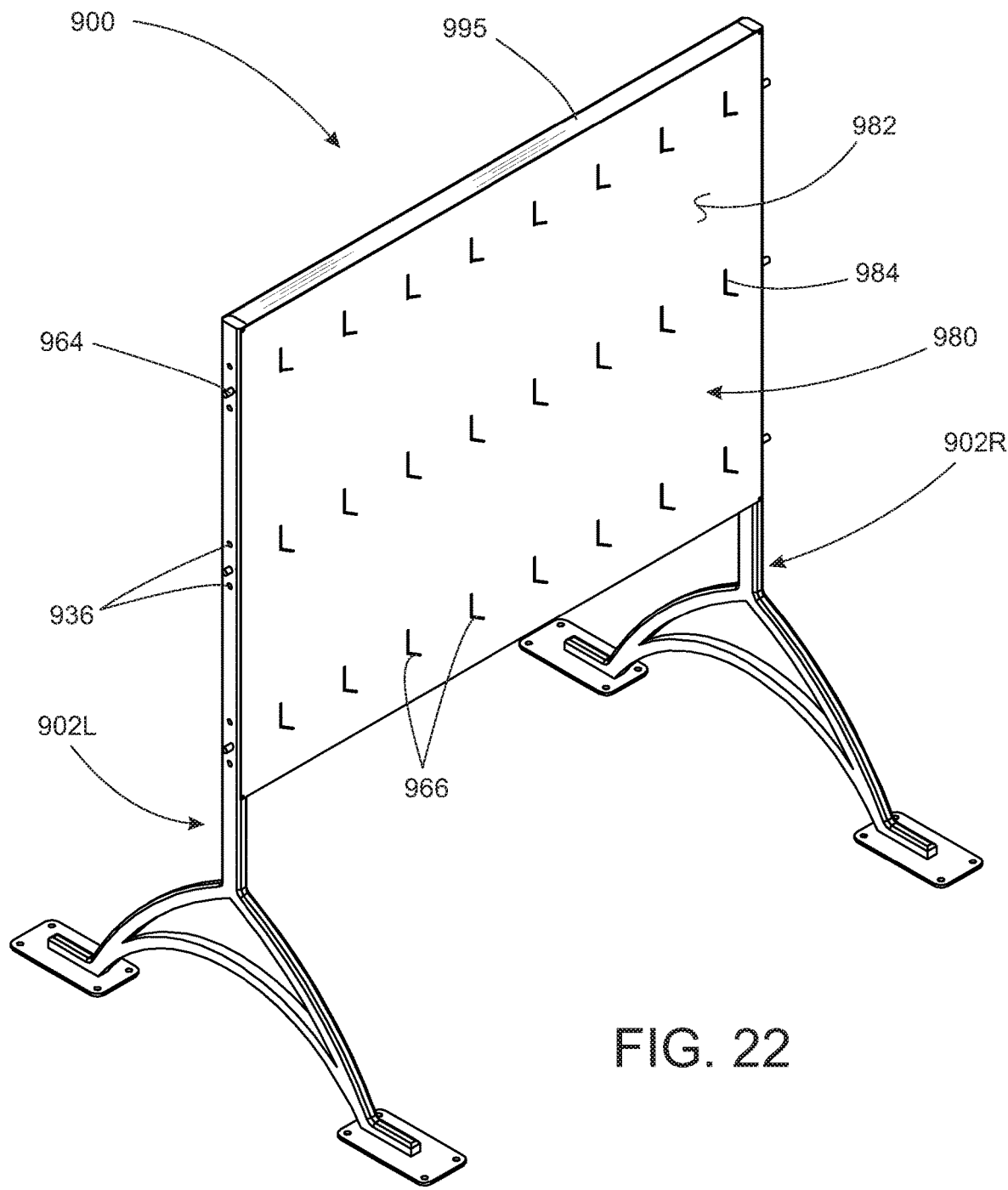
FIG. 22 presents a top-front-left isometric view of the adjustable fish-supporting photographic rack assembly introduced in FIG. 21 shown in a fully-assembled state with all three rows of hooks shown in a deployed state ready to hold fish (including an upper strip 995 for closing the upper gap between the front display panel 980 and rear display panel 990)
Figure 23:
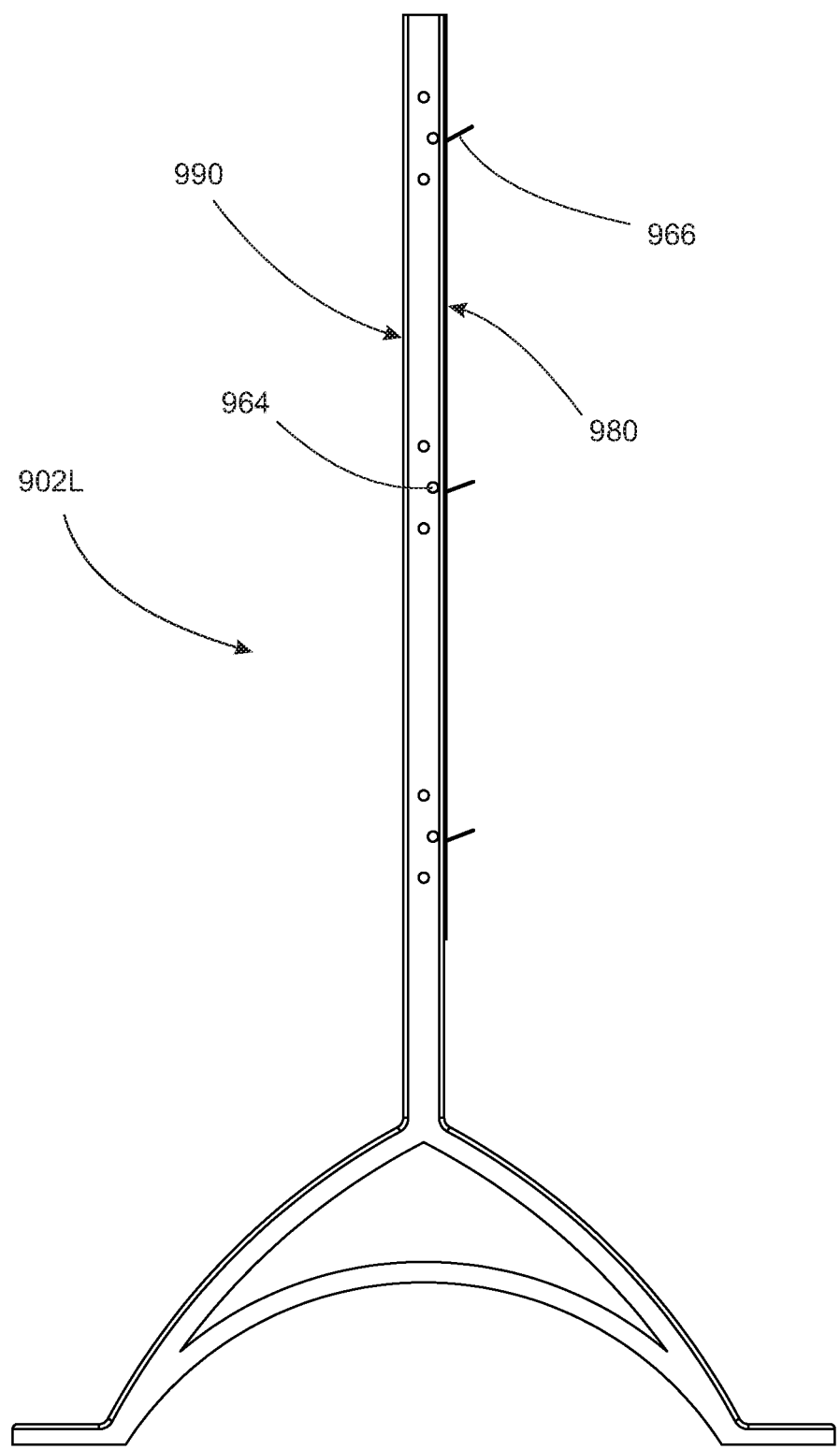
FIG. 23 presents a left side elevation view of the assembled rack assembly introduced in FIG. 22.

A front display panel 980 is provided sized, shaped, and otherwise configured for direct attachment to the front side 916 of the spaced-apart stanchions. Front display panel 980 may be fixedly attached to the front side 916 of the stanchions using mechanical fasteners extending through corner apertures 987 in the front display panel and through corresponding apertures (not shown) in the front side of the stanchions. Significantly, rows of spaced-apart hook passage slots 984 extend completely through the display panel, which are sized, shaped, and positioned such that they are in alignment with the hook retention recesses 954 in the hook rod retaining cross member 940. Significantly, in this manner the display panel slots 984 enable passage of the corresponding spaced-apart hooks 966, during rotation of the selectively-rotatable hook rod 960, between an extended deployed state (as shown in FIGS. 22 and 23) and a fully retracted stowed state. The front display panel 980 functions to protect the hook rod retaining cross members 940a, 940b, 940c from environmental elements. Furthermore, the present invention employs the use of so-called "metal photo prints," which provide aesthetically-pleasing color photographic images printed on aluminum sheets. Details of the construction and manufacture of such metal photo prints is available, for example, at www.Aluminyze.com. Accordingly, the front display panel 980 further provides an aesthetically pleasing backdrop while taking photographs of anglers with their catch of fish displayed on the rack assembly 900. Furthermore, the front display panel 980 provides an aesthetically pleasing image when the photographic rack assembly 900 is not being used in such a manner.

Figure 24:
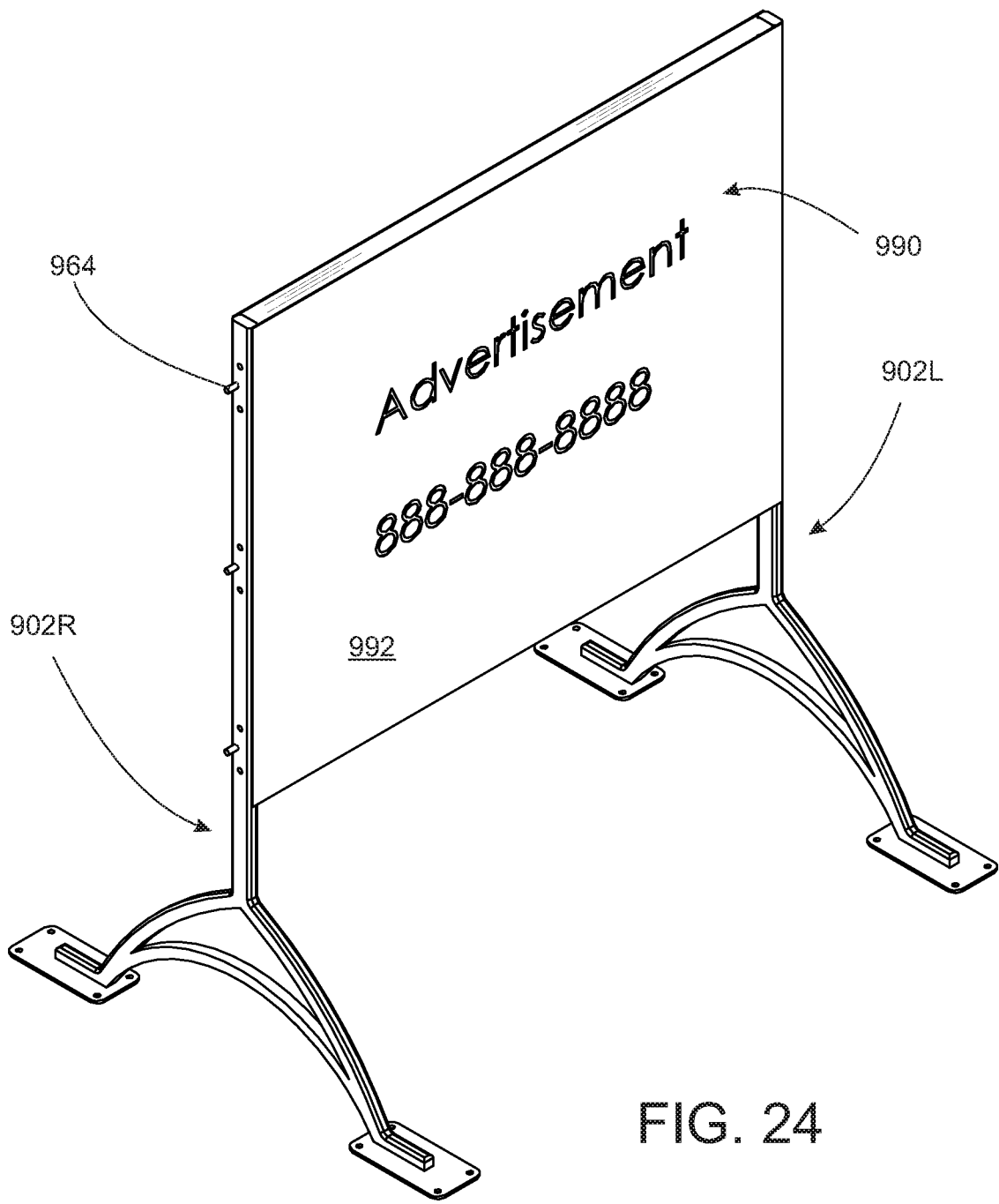
FIG. 24 presents a top-rear-right isometric view of the rack assembly of FIG. 22.

A rear display panel 990 having a similar construction to the front display panel 980 is likewise designed for attachment to the rear side 918 of the spaced-apart stanchions 902L, 902R, via corner apertures 999 that align with corresponding apertures (not shown) in the rear sides 918 of the stanchions 902L, 902R. On its exposed, exterior-facing side 992, the rear display panel may incorporate advertising and marketing information, for example, pertaining to a particular charter boat company, marina, etc. as shown in FIG. 24.

Significantly, the photographic rack assembly 900 has a construction that is conducive to relatively inexpensive manufacture, efficient packaging for sale, and ease of assembly. During assembly, each selectively-rotatable hook rod 960 may be slidably inserted through the corresponding C-shaped channel 948 of a respective hook rod retaining cross member, with the spaced-apart hooks 966 extending outwardly through the opening in the front side 942 of the cross member 940 as the hook rod 960 is slidably inserted therethrough, such that the individual spaced-apart hooks 966 are in direct alignment with the corresponding spaced-apart hook retention recesses 954 of the cross member when the hook rod is in a fully-inserted position. In this fully-inserted position distal end portions 964 of hook rod main body 962 extend outwardly a distance beyond the corresponding ends 944, 945 of the cross member.

Subsequently, the distal end portions 964 are received through corresponding distal end receiving apertures of a corresponding series of stanchion apertures 922a, 922b, 922c such that internally-threaded apertures 946 (or, alternatively, threaded sleeves press-fitted into the cross member apertures) at the ends of each cross member 940 align with corresponding cross member stanchion attachment apertures 926. Subsequently, mechanical fasteners 936 are extended through the aligned apertures to securely fasten the hook rod retaining cross members traversing the spaced-apart stanchions 902L, 902R. Subsequently, hook rod rotation knobs 934, or the like, may be disposed upon the distal end portions 964 of the main body 962 of each selectively rotatable hook rod 960. Subsequently, with the hook rod retaining cross members securely fastened to the spaced-apart stanchions 902L, 902R the front and rear display panels, 980 and 990, respectively, are assembled to the front and rear edges 916, 918 of the stanchions, and upper cover strip 995 snap-fitted or otherwise attached to the top of the assembly between upper edges of the front and rear display panels.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence. By way of example, it is contemplated to incorporate a wheel or roller subassembly, or the like, either along a lower edge of the main panel body and/or panel corner supports in order to provide means for rolling the assembly along a ground surface rather than carrying the assembly.

What is claimed is:

1. An adjustable fish-supporting photographic rack assembly for temporarily holding a plurality of fish, the rack comprising:
   a main panel body having a front surface, a rear surface, left and right edges, and upper and lower edges;
   at least one structural feature integrated into the front surface of the main panel body;
   at least one fish-supporting hook member; and
   at least one hook-receiving structure for selectively coupling said at least one fish-supporting hook member to said main panel body front surface,
   wherein said at least one fish-supporting hook member and said at least one hook-receiving structure are inter-engageable in a manner enabling said at least one fish-supporting hook member to be selectively adjusted between an open fish-hanging position and a closed position.

2. The rack assembly of claim 1, further comprising a pair of main panel body supports sized, shaped and otherwise configured for engagement with said main panel body in order to securely maintain said main panel body in a vertically-oriented upright manner.

3. The rack assembly of claim 1, further comprising:
   at least one aperture extending into said upper edge of said main body panel;
   a banner advertising subassembly configured for being selectively mounted upon said main body panel upper edge via at least one support post affixed to said banner and configured for releasably coupling with said at least one aperture extending into said main body panel upper edge.

4. The rack assembly of claim 1, wherein:
   said at least one structural feature integrated into the front surface of the main panel body further comprises a lateral dovetail groove extending between said left and right main panel body edges; and
   said at least one hook-receiving structure for selectively coupling said at least one hook-supporting member to said main panel body front surface further comprises a laterally-extending hook-supporting member having a T-shaped channel extending through a bottom surface thereof for slidably-receiving said at least one fish-supporting hook member therein.

5. The rack assembly of claim 1, wherein:
   said at least one structural feature integrated into the front surface of the main panel body further comprises a lateral dovetail groove extending between said left and right main panel body edges; and
   said at least one hook-receiving structure for selectively coupling said at least one fish-supporting hook member to said main panel body front surface further comprises a plurality of block members sized, shaped and otherwise configured for being slidably-received within the laterally-oriented dovetail groove and having a corresponding fish-supporting hook member securely affixed thereto and extending outwardly therefrom, such that individual hook-supporting blocks may be selectively translated along the dovetail groove to corresponding desired locations along said groove.

6. The rack assembly of claim 1, wherein said at least one hook-receiving structure for selectively coupling said at least one hook-supporting member to said main panel body front surface further comprises at least one hook-supporting bracket member affixed to said main panel body front surface.

7. The rack assembly of claim 1, wherein said at least one hook-receiving structure for selectively coupling said at least one hook-supporting member to said main panel body front surface further comprises at least one selectively pivotable hook subassembly mounted within at least one main panel body cavity extending into said main panel body front surface.

8. The rack assembly of claim 1, wherein:
   said at least one structural feature integrated into the front surface of the main panel body further comprises a plurality of spaced-apart apertures;
   said at least one fish-supporting hook member further includes an externally-threaded end portion; and
   said at least one hook-receiving structure for selectively coupling said at least one fish-supporting hook member to said main panel body front surface further comprises a plurality of mechanical barrel members fixedly secured within respective ones of said plurality of spaced-apart apertures, each of said barrel members having a threaded internal surface for threading engagement with the corresponding externally threaded end portion of said at least one fish-supporting hook member.

9. An adjustable fish-supporting photographic rack assembly for temporarily holding a plurality of fish, the rack comprising:
- a pair of spaced-apart left and right support stanchions, each support stanchion having a vertical stanchion body portion extending upwardly from a lower stanchion support portion;
- a plurality of vertically spaced hook rod-retaining cross members extending between the vertical stanchion body portions and each attached thereto at opposite cross member ends, each said cross member having a C-shaped channel extending laterally therethrough to define lateral access openings at said cross member ends and a lateral slot-shaped opening extending through a front side thereof, each cross member further including a plurality of spaced-apart hook retention recesses;
- a plurality of selectively-rotatable hook-containing rods seated within the corresponding C-shaped channels of said hook rod-retaining cross members, each of said hook-containing rods having opposite distal end portions extending outwardly beyond the corresponding cross member opposite ends and through hook rod distal end receiving apertures provided in the vertical stanchion body portions of the spaced-apart stanchions;
- a plurality of manually manipulatable rotation knobs disposed upon the distal end portions of said hook-containing rods in a manner enabling manual rotation of each said hook-containing rod between deployed and retracted hook positions; and
- a front display panel attached to a front side of said stanchions and having a plurality of rows of vertically-oriented slots extending completely therethrough, each row of vertically-oriented slots aligned with the plurality of spaced-apart hook retention recesses of a corresponding one said cross members.

10. The rack assembly of claim 9, further comprising:
- a rear display panel attached to a rear side of said stanchions; and
- an upper cover strip traversing upper ends of the spaced-apart stanchions and extending between upper edges of said front and rear display panels.

* * * * *